(12) United States Patent
Ootorii

(10) Patent No.: US 10,775,574 B2
(45) Date of Patent: Sep. 15, 2020

(54) OPTICAL CONNECTOR AND OPTICAL TRANSMISSION MODULE

(71) Applicant: SONY CORPORATION, Tokyo (JP)

(72) Inventor: Hiizu Ootorii, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/071,013

(22) PCT Filed: Dec. 13, 2016

(86) PCT No.: PCT/JP2016/086983
§ 371 (c)(1),
(2) Date: Jul. 18, 2018

(87) PCT Pub. No.: WO2017/130586
PCT Pub. Date: Aug. 3, 2017

(65) Prior Publication Data
US 2019/0033528 A1 Jan. 31, 2019

(30) Foreign Application Priority Data

Jan. 28, 2016 (JP) .................... 2016-014661

(51) Int. Cl.
*G02B 6/42* (2006.01)
*G02B 6/02* (2006.01)
(Continued)

(52) U.S. Cl.
CPC ............ *G02B 6/4249* (2013.01); *G02B 6/02* (2013.01); *G02B 6/262* (2013.01); *G02B 6/3628* (2013.01);
(Continued)

(58) Field of Classification Search
CPC ... G02B 6/32; G02B 6/42; G02B 6/02; G02B 6/4244; G02B 6/3628; G02B 6/4206; G02B 6/262; G02B 6/4214; G02B 6/4249
(Continued)

(56) References Cited

U.S. PATENT DOCUMENTS

2009/0213467 A1\* 8/2009 Mitra .................. G02B 3/0006
359/624
2013/0266262 A1\* 10/2013 Nishimura ............... G02B 6/32
385/35
(Continued)

FOREIGN PATENT DOCUMENTS

JP  H11-170605   6/1999
JP  2003-023204  1/2003
(Continued)

OTHER PUBLICATIONS

International Search Report prepared by the Japan Patent Office dated Feb. 21, 2017, for International Application No. PCT/JP2016/086983.

*Primary Examiner* — Michael P Mooney
(74) *Attorney, Agent, or Firm* — Sheridan Ross P.C.

(57) ABSTRACT

To provide an optical connector and an optical transmission module that are suitable for a plurality of optical transmission paths two-dimensionally arranged.
An optical connector according to the present technology is an optical connector for a plurality of optical transmission paths arranged in a two-dimensional array and includes a first lens, a second lens, a third lens, and a fourth lens. The first lens reflects emitted light from a first optical transmission path of the plurality of optical transmission paths. The second lens reflects emitted light from a second optical transmission path of the plurality of optical transmission (Continued)

paths. The third lens collimates light reflected by the first lens. The fourth lens collimates light reflected by the second lens.

11 Claims, 16 Drawing Sheets

(51) Int. Cl.
G02B 6/26 (2006.01)
G02B 6/36 (2006.01)
(52) U.S. Cl.
CPC ......... *G02B 6/4206* (2013.01); *G02B 6/4214* (2013.01); *G02B 6/4244* (2013.01)
(58) Field of Classification Search
USPC .................. 385/49–52, 53, 78, 88–92, 33
See application file for complete search history.

(56) References Cited

U.S. PATENT DOCUMENTS

| | | | | |
|---|---|---|---|---|
| 2014/0294339 A1* | 10/2014 | Lagziel | ............... | G02B 6/2804 385/14 |
| 2015/0219863 A1* | 8/2015 | Haase | ................. | G02B 6/3883 385/60 |
| 2016/0147027 A1* | 5/2016 | DeMeritt | ............. | G02B 6/4214 385/89 |

FOREIGN PATENT DOCUMENTS

| | | |
|---|---|---|
| JP | 2013-235243 | 11/2013 |
| JP | 2014-048640 | 3/2014 |
| JP | 2015-530628 | 10/2015 |
| WO | WO 2014/119353 | 8/2014 |

* cited by examiner

OPTICAL CONNECTOR AND OPTICAL TRANSMISSION MODULE

CROSS REFERENCE TO RELATED APPLICATIONS

This application is a national stage application under 35 U.S.C. 371 and claims the benefit of PCT Application No. PCT/JP2016/086983 having an international filing date of 13 Dec. 2016, which designated the United States, which PCT application claimed the benefit of Japanese Patent Application No. 2016-014661 filed 28 Jan. 2016, the entire disclosures of each of which are incorporated herein by reference.

TECHNICAL FIELD

The present technology relates to an optical connector and an optical transmission module that can be used for optical communication.

BACKGROUND ART

In recent years, as one of optical transmission technologies, which attract attention, there is a technology that realizes capacity enlargement by using a plurality of optical fibers two-dimensionally arranged. In this technology, an optical connector capable of connecting the plurality of optical fibers two-dimensionally arranged to a connection target object is necessary.

Conventionally, a vertical-type optical connector by which a plurality of optical fibers are perpendicularly connected to a connection target surface has been used. On the other hand, for installing an optical connector in a customer device, a horizontal-type optical connector by which a plurality of optical fibers are connected in parallel to a connection target surface is more advantageous in view of reductions in thickness and cost.

Here, in a state in which the optical connector is attached to a substrate on which a photoelectric conversion element is disposed, optical coupling between the optical fibers and the photoelectric conversion element is achieved. In a case of using an inexpensive organic substrate having a smaller mechanical strength as this substrate, position precision of the optical connector and the substrate becomes a problem. In contrast, an optical connector of a collimated light coupling type that collimates emitted light from optical fibers and transmits the collimated light to the photoelectric conversion element is strong against optical axis deviation and attracts attention.

For example, Patent Literature 1 has disclosed an optical connector for connecting a plurality of optical fibers arranged in one row. This optical connector includes a reflection surface, which emitted light from the plurality of optical fibers enters, and a lens, which light reflected on the reflection surface enters. The lens collimates incident light and emits the collimated light to a photoelectric conversion element.

CITATION LIST

Patent Literature

Patent Literature 1: Japanese Patent

DISCLOSURE OF INVENTION

Technical Problem

Here, the optical connector described in Patent Literature 1 connects the plurality of optical fibers arranged in one row. It is desirable to provide an optical connector capable of connecting a plurality of optical transmission paths two-dimensionally arranged and also capable of achieving reductions in thickness and cost.

In view of the above-mentioned circumstances, it is an object of the present technology to provide an optical connector and an optical transmission module that are suitable for a plurality of optical transmission paths two-dimensionally arranged.

Solution to Problem

In order to accomplish the above-mentioned object, an optical connector according to an embodiment of the present technology is an optical connector for a plurality of optical transmission paths arranged in a two-dimensional array and includes a first lens, a second lens, a third lens, and a fourth lens.

The first lens reflects emitted light from a first optical transmission path of the plurality of optical transmission paths.

The second lens reflects emitted light from a second optical transmission path of the plurality of optical transmission paths.

The third lens collimates light reflected by the first lens.

The fourth lens collimates light reflected by the second lens.

With this configuration, light emitted from the first optical transmission path is reflected by the first lens toward the third lens and is collimated by the third lens. Further, light emitted from the second optical transmission path is reflected by the second lens toward the fourth lens and is collimated by the fourth lens. The collimated light emitted from the third lens and the collimated light emitted from the fourth lens enter the photoelectric conversion elements respectively opposed to the third lens and the fourth lens and are photoelectrically converted. Due to the provision of the third lens and the fourth lens, the present optical connector emits collimated light having reduced optical coupling loss due to optical axis deviation caused by position deviation or the like of the optical connector. Thus, an organic substrate which has a relatively low position precision but is inexpensive can be used for connection. Further, in a case where the optical transmission paths are two-dimensionally arranged, the optical path length from the first optical transmission path to the third lens and the optical path length from the second optical transmission path to the fourth lens are longer in comparison with a case where the optical transmission paths are one-dimensionally arranged. However, due to the provision of the first lens and the second lens, the light diameter of light entering the third lens and the light diameter of light entering the fourth lens can be made smaller, and the light diameter of the collimated light emitted from the third lens and the light diameter of the collimated light emitted from the fourth lens can be reduced. Thus, it becomes possible to prevent vignetting of light at the third lens and the fourth lens and to reduce the optical coupling loss. That is, the present optical connector is capable of transmitting high-integrity optical signals at low cost.

The third lens may concentrate collimated light incoming in a direction opposite to that of the emitted light from the first optical transmission path, on the first optical transmission path via the first lens, and the fourth lens may concentrate collimated light incoming in a direction opposite to that of the emitted light from the second optical transmission path, on the second optical transmission path via the second lens.

The optical connector according to the present technology is capable of transmitting light emitted from the first optical transmission path and light emitted from the second optical transmission path to the photoelectric conversion elements and is also capable of transmitting light emitted from the photoelectric conversion elements to the first optical transmission path and the second optical transmission path. The third lens and the fourth lens are formed in such a shape that these can concentrate the collimated light incoming from the photoelectric conversion elements on the first optical transmission path and the second optical transmission path.

The first optical transmission path and the second optical transmission path may have an identical numerical aperture,
  the first lens may cause the emitted light from the first optical transmission path to enter the third lens such that the emitted light from the first optical transmission path has a first light diameter at the third lens, and
  the second lens may cause the emitted light from the second optical transmission path to enter the fourth lens such that the emitted light from the second optical transmission path has the first light diameter at the fourth lens.

With this configuration, collimated light and collimated light which have an identical light diameter (first light diameter) are emitted from the third lens and the fourth lens. Assuming that light emitted from the third lens and light emitted from the fourth lens have different light diameters, if the optical connector is inclined or deviated with respect to the photoelectric conversion elements, the optical coupling loss between the third lens and the photoelectric conversion element and the optical coupling loss between the fourth lens and the photoelectric conversion element become different, and the optical signal integrity differs between the first optical transmission path and the second optical transmission path. In contrast, with the present configuration, the emitted light from the third lens and the emitted light from the fourth lens have an identical light diameter, and thus even if the optical connector is inclined or deviated with respect to the photoelectric conversion elements, it is possible to make the optical signal integrity equivalent between the first optical transmission path and the second optical transmission path.

The first light diameter may be 160 μm or more and 200 μm or less.

If the light diameter of the collimated light emitted from the third lens and the fourth lens is too small, the numerical aperture of a condensing lens system becomes smaller, and thus an irradiation spot is greatly blurred. Therefore, it becomes an optical system weak against the inclination of the collimated light, i.e., inclination of the optical connector. Further, if the light diameter of the collimated light is too large, vignetting of light more easily occurs, and the resistance to the lateral deviation of the collimated light becomes smaller. The light diameter is favorably 160 μm or more and 200 μm or less, which is a light diameter keeping this trade-off relationship well-balanced.

The optical connector, in which
  the plurality of optical transmission paths include a first optical transmission path row in which the first optical transmission paths are arranged in a first direction and a second optical transmission path row in which the second optical transmission paths are arranged in the first direction, the first optical transmission path row and the second optical transmission path row being arranged in a second direction orthogonal to the first direction.

In a case where a plurality of optical transmission paths in which two optical transmission path rows are arranged are connected to the optical connector, it is desirable that the optical signal integrity be equivalent between the optical transmission path rows. As described above, the optical connector according to the present technology is capable of making the optical signal integrity equivalent between the optical transmission path rows, and is suitable for connection of the plurality of optical transmission paths in which the two optical transmission path rows are arranged.

An arrangement pitch of the optical transmission paths in the first direction and the second direction may be 250 μm.

As a standard of an optical fiber that can be used as the optical transmission path, there is one having a diameter of 250 μm. The optical connector according to the present technology is suitable for connection of an optical transmission cable in which optical fibers each having a diameter of 250 μm are arranged (i.e., the arrangement pitch is 250 μm).

The first optical transmission paths and the second optical transmission paths may be opposed to a first surface, the third lens and the fourth lens may be provided in a second surface, and the first lens and the second lens may be provided in an inclined surface inclined with respect to a third direction orthogonal to the first direction and the second direction.

With this configuration, light emitted from the first optical transmission path and light emitted from the second optical transmission path enter the first surface, are reflected by the first lens and the second lens provided in the inclined surface, and are emitted from the third lens and the fourth lens provided in the second surface. Further, light emitted from the photoelectric conversion elements is concentrated by the third lens and the fourth lens provided in the second surface, is reflected by the first lens and the second lens provided in the inclined surface, and enters the first optical transmission path and the second optical transmission path from the first surface.

An arrangement pitch of the third lens and the fourth lens in the second surface may be 250 μm.

As described above, the present technology is suitable for connection of an optical transmission cable in which optical fibers each having a diameter of 250 μm are arranged, and is capable of causing the emitted light from the optical fibers arranged at the arrangement pitch of 250 μm to be emitted from the third lens and the fourth lens arranged at the arrangement pitch of 250 μm.

An angle formed by an optical axis of light entering the inclined surface from each of the third lens and the fourth lens and the inclined surface may be smaller than 45°.

By setting the angle of the inclined surface to be smaller than 45° with respect to the optical axis of the incident light, it is possible to reduce the rate of light that is not reflected by the inclined surface and transmits through the inclined surface.

The optical connector may further include an aperture that is provided between lenses of the third lens and the fourth lens and blocks light between adjacent lenses in the second surface.

With this configuration, the aperture makes it possible to prevent leakage of light (stray light) between adjacent lenses.

In order to accomplish the above-mentioned object, an optical transmission module according to an embodiment of the present technology includes a plurality of optical transmission paths and an optical connector.

The plurality of optical transmission paths are arranged in a two-dimensional array.

The optical connector includes a first lens that reflects emitted light from a first optical transmission path of the plurality of optical transmission paths, a second lens that reflects emitted light from a second optical transmission path of the plurality of optical transmission paths, a third lens that collimates light reflected by the first lens, and a fourth lens that collimates light reflected by the second lens.

Advantageous Effects of Invention

As described above, in accordance with the present technology, it is possible to provide an optical connector and an optical transmission module that are suitable for a plurality of optical transmission paths two-dimensionally arranged. It should be noted that the effects described here are not necessarily limitative and any effect described in the present disclosure may be provided.

MODE(S) FOR CARRYING OUT THE INVENTION

First Embodiment

An optical transmission module according to a first embodiment of the present technology will be described.

[Configuration of Optical Transmission Module]

Figure 1:
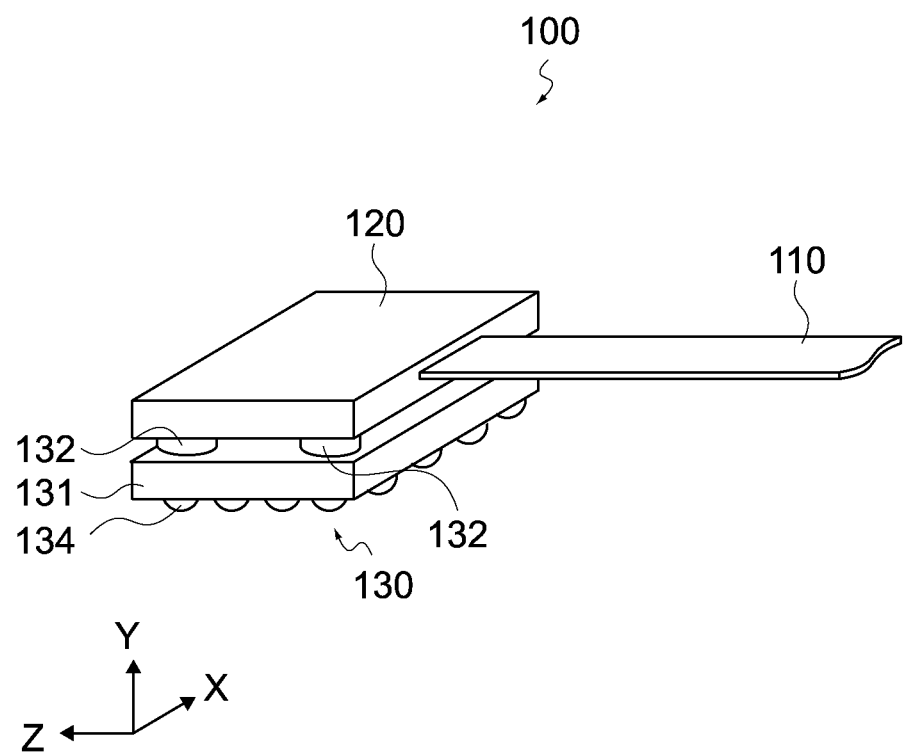
FIG. 1 A perspective view of an optical transmission module according to a first embodiment of the present technology.
Figure 2:
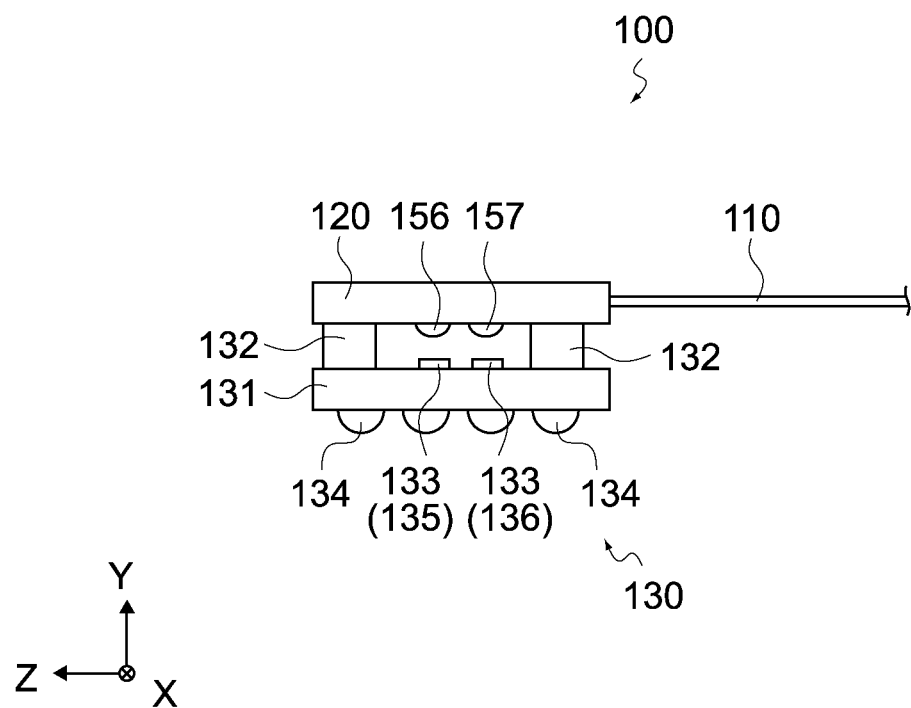
FIG. 2 A cross-sectional view of the optical transmission module.

FIG. 1 is a perspective view showing a configuration of an optical transmission module 100 according to the first embodiment of the present technology. FIG. 2 is a plan view of the optical transmission module 100. Note that three directions orthogonal to one another in the following figures will be defined an X direction, a Y direction, and a Z direction, respectively.

As shown in these figures, the optical transmission module 100 includes an optical transmission cable 110, an optical connector 120, and a connector connection portion 130.

Figure 3:
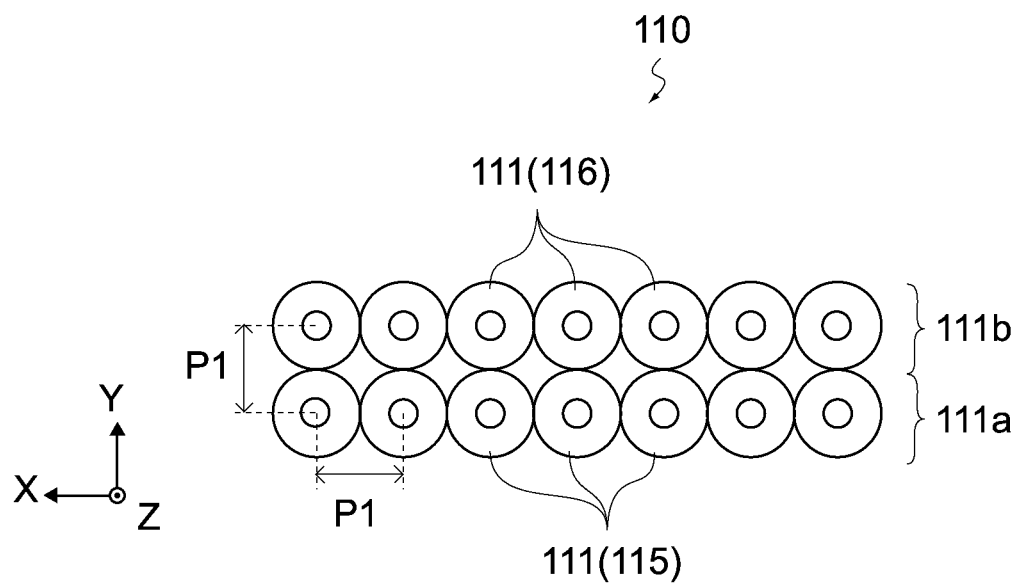
FIG. 3 A cross-sectional view of an optical transmission cable provided in the optical transmission module.

The optical transmission cable 110 includes a plurality of optical transmission paths two-dimensionally arranged. FIG. 3 is a cross-sectional view of the optical transmission cable 110. As shown in the figure, the optical transmission cable 110 includes a plurality of optical fibers 111. Note that the number of optical fibers 111 is not limited to that shown in the figure.

Figure 4:
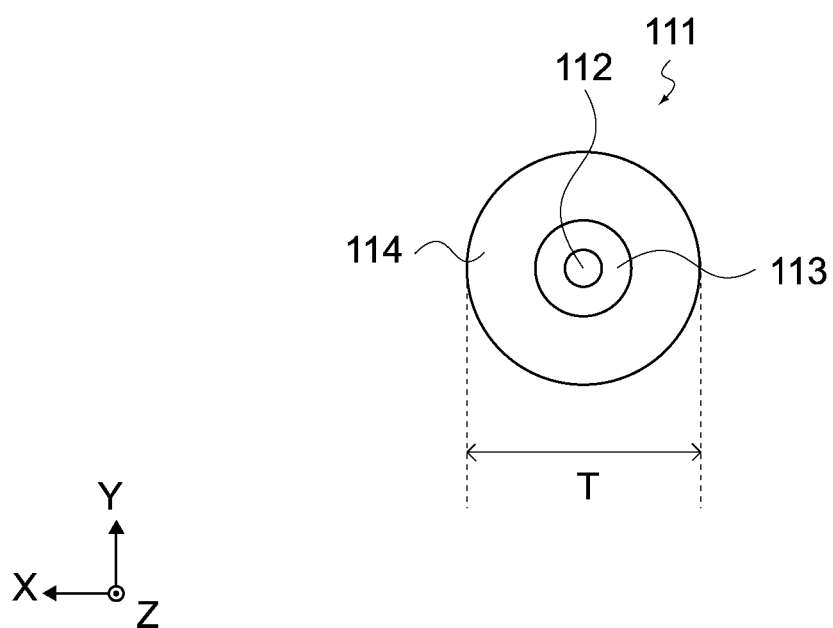
FIG. 4 A cross-sectional view of one of optical fibers constituting the optical transmission cable provided in the optical transmission module.

FIG. 4 is a cross-sectional view of one of the optical fibers 111. As shown in the figure, the optical fiber 111 includes a core 112, a cladding 113, and a coating layer 114.

The core 112 is a fibrous member made of fused quartz, plastic, or the like and has a high light refractive index and a high light transmittance. The cladding 113 is made of fused quartz, plastic, or the like and provided around the core 112.

The cladding 113 has a high light transmittance and has a lower light refractive index than that of the core 112. Light entering the core 112 is reflected on an interface between the core 112 and the cladding 113 and transmitted. That is, the core 112 functions as an optical transmission path.

The coating layer 114 is made of ultraviolet curable resin and the like and coats the cladding 113. The coating layer 114 protects the core 112 and the cladding 113 and adds mechanical strength to the optical fiber 111.

Although the optical fiber 111 may be a multi-mode optical fiber or may be a single-mode optical fiber, the multi-mode optical fiber is favorable. The numerical aperture (NA) of the optical fiber 111 can be 0.2, for example.

As shown in FIG. 3, the optical transmission cable 110 includes an optical fiber row 111a in which the optical fibers 111 are arranged in the X direction and an optical fiber row 111b in which the optical fibers 111 are also arranged in the X direction. The optical fiber row 111a and the optical fiber row 111b are arranged in the Y direction.

Therefore, the cores 112 of the respective optical fibers 111 are arranged in two directions of the X direction and the Y direction, i.e., are two-dimensionally arranged. Although not particularly limited, the number of optical fibers 111 of each optical fiber row can be several to several hundreds of optical fibers. Further, the number of optical fiber rows is not limited to two, and the optical transmission cable 110 may include more optical fiber rows than those arranged in the Y direction.

An arrangement pitch of the optical fibers 111 in the X direction and the Y direction (in the figure, P1, distance between the centers of the optical fibers 111) can be 250 µm, for example.

Hereinafter, the optical fibers 111 of the optical fiber row 111a will be referred to as optical fibers 115 and the optical fibers 111 of the optical fiber row 111b will be referred to as optical fibers 116.

The plurality of optical fibers 111 may be each independent and form the arrangement as shown in FIG. 3 by being inserted into the optical connector 120. Alternatively, the plurality of optical fibers 111 may be integrated with the arrangement as shown in FIG. 3 by being coated with resin and the like or being fixed with a fixing member.

The optical connector 120 is attached to the connector connection portion 130. The optical connector 120 emits light entering from the optical transmission cable 110 to the connector connection portion 130 and emits light entering from the connector connection portion 130 to the optical transmission cable 110. Although a detailed configuration of the optical connector 120 will be described later, the optical connector 120 includes collimating lenses 156 and collimating lenses 157 that are opposed to the connector connection portion 130 as shown in FIG. 2.

Note that, at an end portion of the optical transmission cable 110 which is opposite to the optical connector 120, an optical connector having a structure identical to that of the optical connector 120 may be provided.

The connector connection portion 130 is mounted on a mount target object (not shown). The connector connection portion 130 converts light entering from the optical connector 120 into electrical signals. The connector connection portion 130 also converts electrical signals into light and emits the light to the optical connector 120. As shown in FIGS. 1 and 2, the connector connection portion 130 includes a substrate 131, connector-supporting portions 132, photoelectric conversion elements 133, and terminals 134.

The substrate 131 supports the connector-supporting portions 132 and the photoelectric conversion elements 133. Although not shown in the figure, the substrate 131 is provided with wires that electrically connect an integrated circuit and respective sections for controlling the photoelectric conversion elements 133. As the substrate 131, an organic substrate made of an organic material such as synthetic resin can be used.

The connector-supporting portions 132 are provided in the substrate 131, and support the optical connector 120 and position the optical connector 120 with respect to the connector connection portion 130. The connector-supporting portions 132 can position the optical connector 120 by being engaged with holes or the like provided in the optical connector 120.

Figure 5:
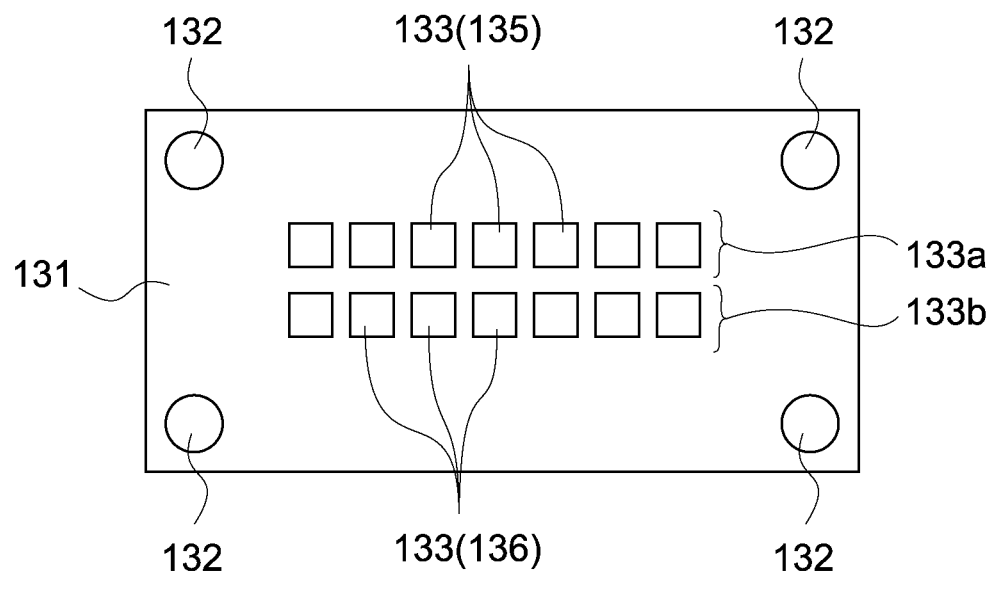
FIG. 5 A plan view of a connector connection portion provided in the optical transmission module.

The plurality of photoelectric conversion elements 133 are provided in the substrate 131 and function as light-emitting elements, light-receiving elements, or light-emitting and light-receiving elements. FIG. 5 is a schematic view showing an arrangement of the photoelectric conversion elements 133. As shown in the figure, the photoelectric conversion elements 133 form, on the substrate 131, a photoelectric conversion element row 133a in which the photoelectric conversion elements 133 are arranged in the X direction and a photoelectric conversion element row 133b in which the photoelectric conversion elements 133 are also arranged in the X direction. The photoelectric conversion element row 133a and the photoelectric conversion element row 133b are arranged in the Z direction.

Hereinafter, the photoelectric conversion elements 133 of the photoelectric conversion element row 133a will be referred to as photoelectric conversion elements 135 and the photoelectric conversion elements 133 of the photoelectric conversion element row 133b will be referred to as photoelectric conversion elements 136.

As shown in FIG. 2, the photoelectric conversion elements 135 are opposed to the collimating lenses 156. An optical system (not shown) is provided between the photoelectric conversion elements 135 and the collimating lenses 156. In a case where the photoelectric conversion elements 135 are light-receiving elements, collimated light emitted from the collimating lenses 156 enters the photoelectric conversion elements 135 via the optical system. Further, in a case where the photoelectric conversion elements 135 are light-emitting elements, light emitted from the photoelectric conversion elements 135 becomes collimated light via the optical system and enters the collimating lenses 156.

Further, the photoelectric conversion elements 136 are opposed to the collimating lenses 157. An optical system (not shown) is provided between the photoelectric conversion elements 136 and the collimating lenses 157. In a case where the photoelectric conversion elements 136 are light-receiving elements, collimated light emitted from the collimating lenses 157 enters the photoelectric conversion elements 136 via the optical system. Further, in a case where the photoelectric conversion elements 136 are light-emitting elements, light emitted from the photoelectric conversion elements 136 becomes collimated light via the optical system and enters the collimating lenses 157.

The terminals 134 are made of an electrically conductive material and electrically connect the connector connection portion 130 to the mount target object. The arrangement and shape of the terminals 134 are not particularly limited. Further, the terminals 134 do not need to be used for connecting the organic substrate 131 to the mount target object, and a generally-used electric connector may be used for connecting the organic substrate 131 to the mount target object. Note that the connector connection portion 130 is an example of the connection target of the optical connector 120, and the connection target of the optical connector 120 is not limited to the connector connection portion 130. For example, the optical connector 120 can be connected to an optical function element that is installed on the organic substrate and emits or receives collimated light, an optical connector that is installed on the organic substrate and emits or receives collimated light, a photoelectric conversion element, an optical function element, or an optical connector that is installed on a weak base material like the organic substrate and emits or receives collimated light, or the like. Further, the optical connector 120 may be connected to another optical connector 120.

[Configuration of Optical Connector]

Figure 6:
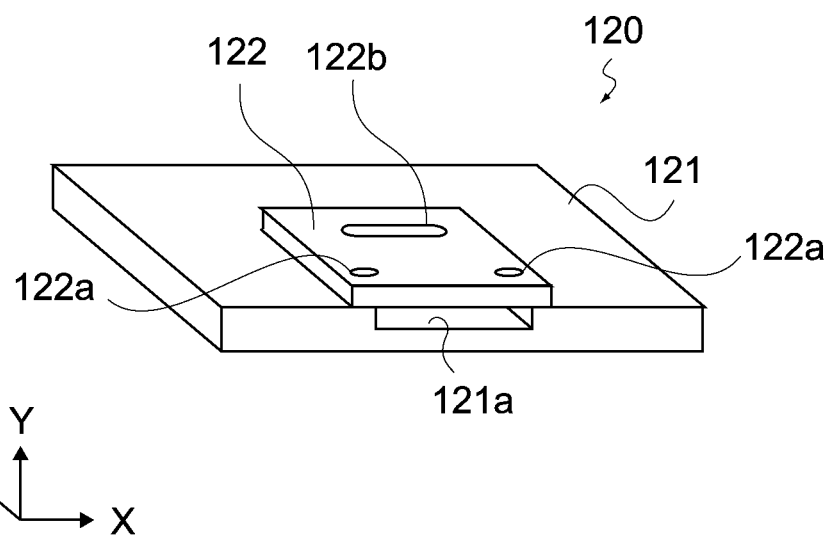
FIG. 6 A perspective view of an optical connector provided in the optical transmission module.
Figure 7:
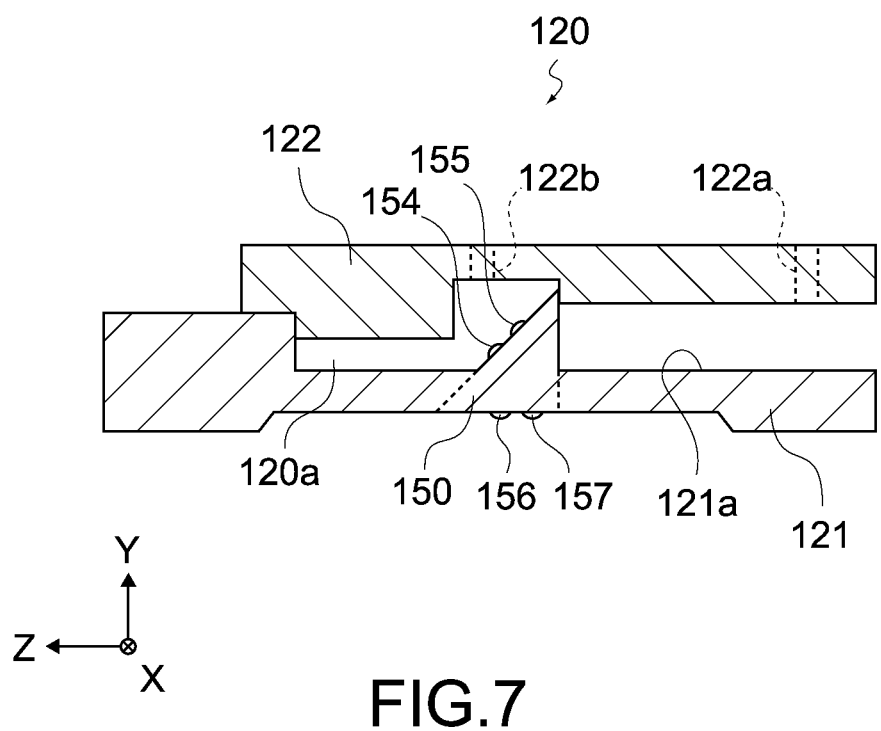
FIG. 7 A cross-sectional view of the optical connector provided in the optical transmission module.

FIG. 6 is a perspective view of the optical connector 120. FIG. 7 is a cross-sectional view of the optical connector 120. As shown in these figures, the optical connector 120 includes a supporting member 121 and a cover member 122.

Figure 8:
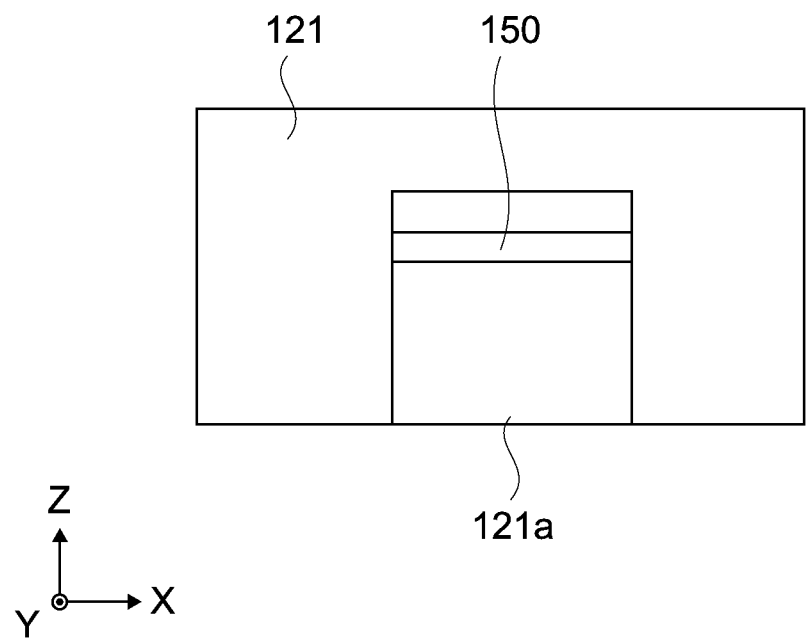
FIG. 8 A plan view of a supporting member of the optical connector provided in the optical transmission module.

FIG. 8 is a plan view of the supporting member 121. As shown in FIGS. 6 to 8, the supporting member 121 is provided with a recess portion 121a. In the recess portion 121a, a light-guiding portion 150 is provided.

The cover member 122 is joined with the supporting member 121, covering the recess portion 121a. The cover member 122 is provided with injection holes 122a communicating with the recess portion 121a.

Figure 9:
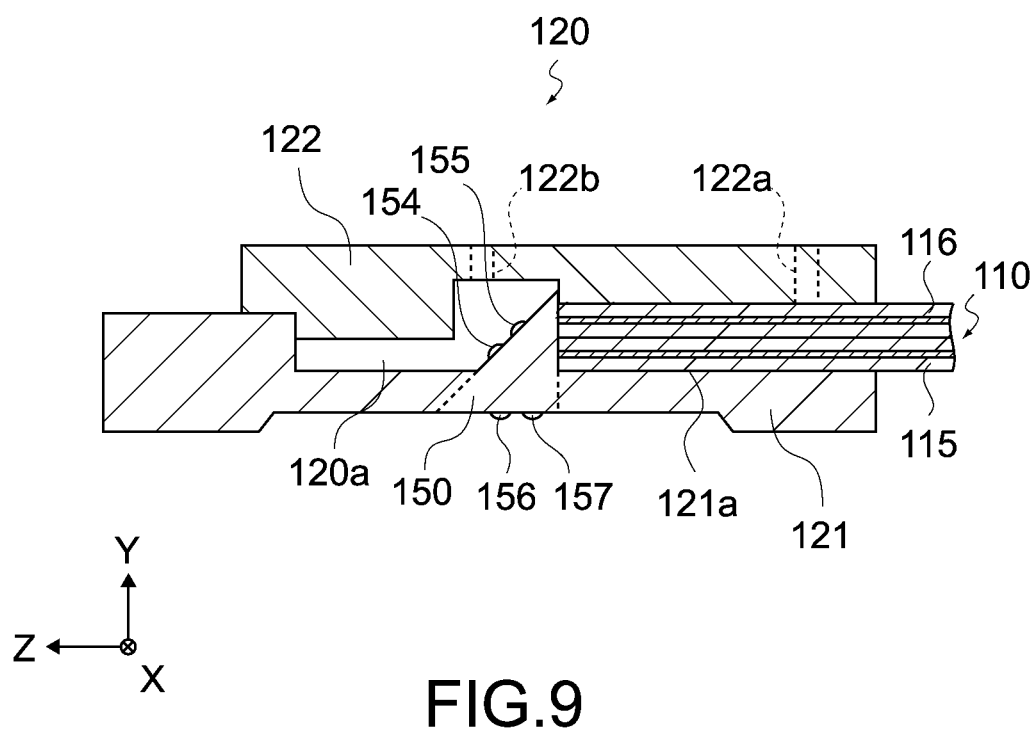
FIG. 9 A cross-sectional view of the optical connector and the optical transmission cable which are provided in the optical transmission module.

FIG. 9 is a schematic view showing the optical connector 120 and the optical transmission cable 110. As shown in the figure, the optical transmission cable 110 is inserted into the recess portion 121a and is disposed in such a manner that the end portion of the optical transmission cable 110 is opposed to the light-guiding portion 150.

After the optical transmission cable 110 is disposed in the recess portion 121a, an adhesive is injected through the injection holes 122a, and the supporting member 121, the optical transmission cable 110, and the cover member 122 are fixed to one another. Further, a space 120a, which is formed by the supporting member 121 and the cover member 122, is sealed by sealing resin being injected therein through an injection hole 122b.

The configuration of the optical connector 120 is not limited to the above-mentioned one, and any configuration can be employed as long as it can provide a structure with which the end portion of the optical transmission cable 110 can be opposed and fixed to the light-guiding portion 150.

[Configuration of Light-Guiding Portion]

Figure 10:
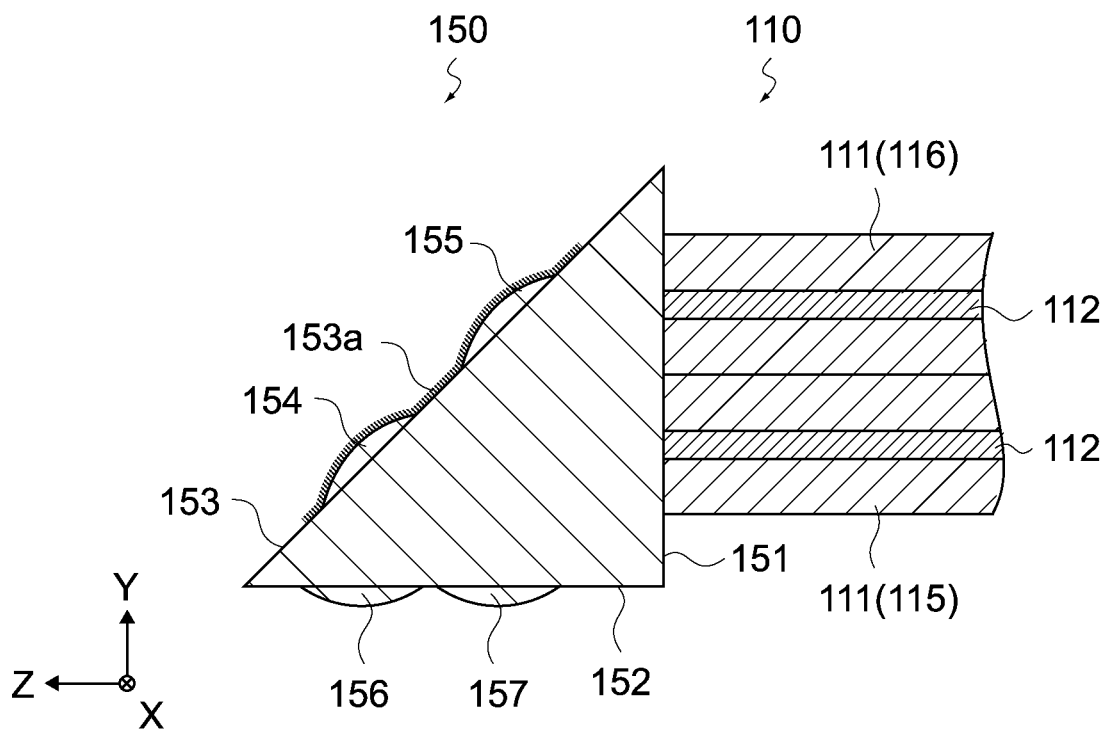
FIG. 10 A cross-sectional view of a light-guiding portion of the optical connector and the optical transmission cable which are provided in the optical transmission module.
Figure 11:
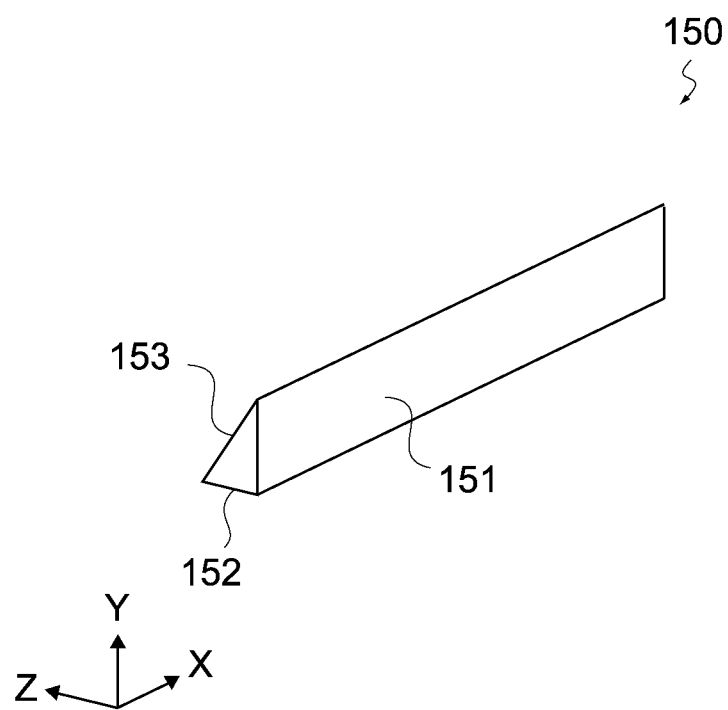
FIG. 11 A perspective view of the light-guiding portion of the optical connector provided in the optical transmission module.

FIG. 10 is a cross-sectional view of the light-guiding portion 150 and the optical transmission cable 110. FIG. 11 is a perspective view of the light-guiding portion 150. As shown in these figures, the light-guiding portion 150 is a triangular prism-shape portion including a first surface 151, a second surface 152, and an inclined surface 153.

As shown in FIG. 3, it is assumed that the arrangement direction of the optical fibers 111 in the optical fiber row 111a and the optical fiber row 111b is the X direction, the arrangement direction of the optical fiber row 111a and the optical fiber row 111b is the Y direction, and the optical axis direction of emitted light from the optical fibers 111 is the Z direction.

The first surface 151 is a surface extending along an X-Y plane and the second surface 152 is a surface extending along an X-Z plane. The inclined surface 153 is a surface inclined with respect to the X-Z plane. The angle of inclination with respect to the X-Z plane can be 45° or 50°, for example.

As shown in FIG. 9, the light-guiding portion 150 is a part of the supporting member 121. Parts of the first surface 151 and the inclined surface 153 can be continuous with the supporting member 121.

Alternatively, the light-guiding portion 150 may be a member different from the supporting member 121. Although not particularly limited, the material of the light-guiding portion 150 is favorably a material having a high light permeability and a high light resistance. For example, polyphenylenesulfide (PPS) can be used.

As shown in FIG. 10, end portions of the optical fibers 111 are opposed to the first surface 151. These end portions may be held in contact with the first surface 151 or may be spaced apart from the first surface 151. It should be noted that, in a case where the end portions are spaced apart from the first surface 151, distances between the respective end portions of the optical fibers 111 and the first surface 151 need to be identical.

Figure 12:
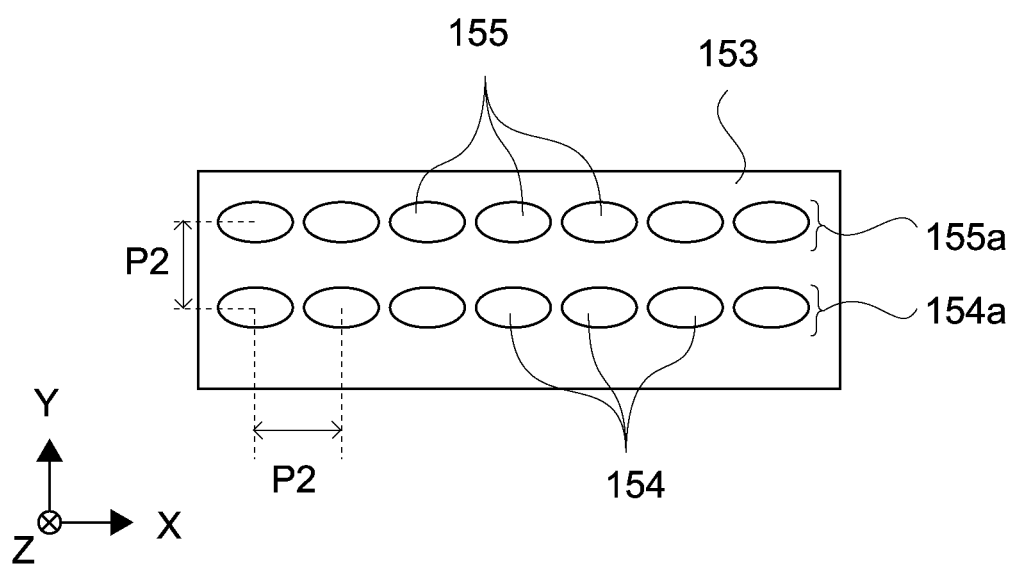
FIG. 12 A plan view of an inclined surface of the light-guiding portion of the optical connector provided in the optical transmission module.

In the inclined surface 153, reflection lenses 154 and reflection lenses 155 are provided. FIG. 12 is a view of the inclined surface 153 as viewed in the Z direction. As shown in the figure, in the inclined surface 153, there are provided a reflection lens row 154a formed by the plurality of reflection lenses 154 arranged in the X direction and a reflection lens row 155a formed by the plurality of reflection lenses 155 also arranged in the X direction.

As shown in FIG. 12, the reflection lens 154 can have an elliptical shape having a major-axis direction in the Y direction. Further, the reflection lens 154 may have an elliptical shape having a minor-axis direction in the Y direction. The number of reflection lenses 154 is equal to the number of optical fibers 115. The respective reflection lenses 154 are opposed to the respective optical fibers 115 in the Z direction.

As shown in FIG. 12, the reflection lens 155 can have an elliptical shape having a major-axis direction in the Y direction. Further, the reflection lens 155 may have an elliptical shape having a minor-axis direction in the Y direction. The number of reflection lenses 155 is equal to the number of optical fibers 116. The respective reflection lenses 155 are opposed to the respective optical fibers 116 in the Z direction.

The inclined surface 153 in which the reflection lenses 154 and the reflection lenses 155 are provided is inclined with respect to the X-Z plane. Therefore, the center of the reflection lens 154 and the center of the reflection lens 155 are spaced apart from each other in the Z direction and the Y direction. An arrangement pitch of the reflection lenses 154 and the reflection lenses 155 in the inclined surface 153 (in the figure, P2, distance between the centers of the respective lenses) can be 250 μm, for example.

Further, as shown in FIG. 10, a light reflection region 153a is provided in the inclined surface 153. The light reflection region 153a is a total reflection mirror or a metal mirror, and can be obtained by forming a thin film made of a material having a high light reflectance, such as aluminum or stainless steel, on the inclined surface 153. The light reflection region 153a may be provided in the entire inclined surface 153 or may be provided only inside the reflection lenses 154 and the reflection lenses 155.

Figure 13:
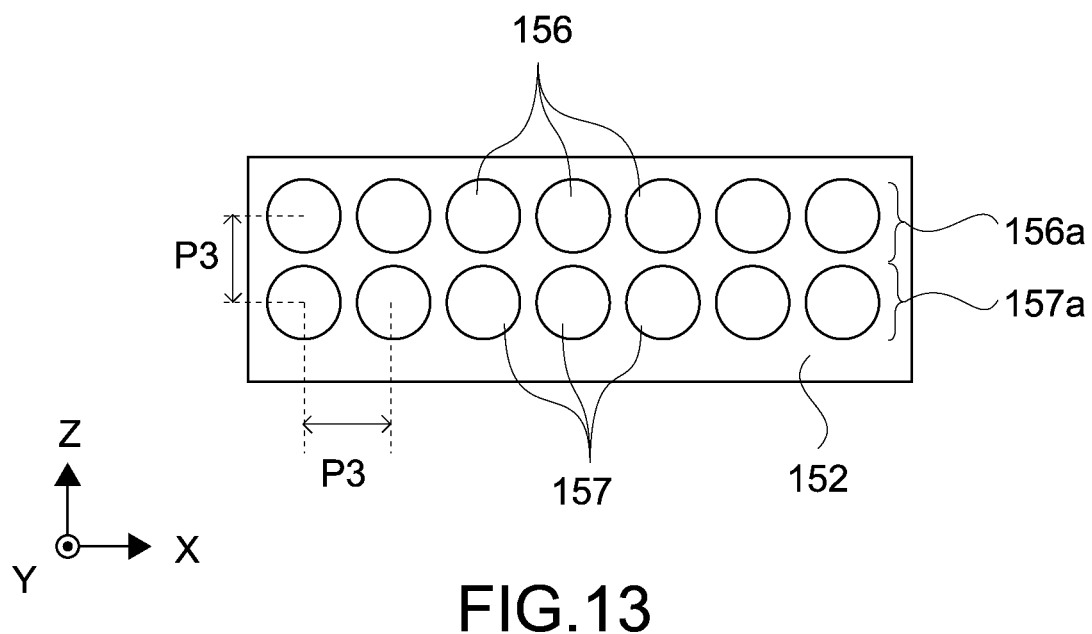
FIG. 13 A plan view of a second surface of the light-guiding portion of the optical connector provided in the optical transmission module.

In the second surface 152, the collimating lenses 156 and the collimating lenses 157 are provided. FIG. 13 is a view of the second surface 152 as viewed in the Y direction. As shown in the figure, in the second surface 152, a collimating lens row 156a formed by the plurality of collimating lenses 156 arranged in the X direction and a collimating lens row 157a formed by the plurality of collimating lenses 157 also arranged in the X direction are provided. The collimating lens row 156a and the collimating lens row 157a are arranged in the Z direction.

The collimating lens 156 is a spherical lens or a non-spherical lens. The collimating lens 156 can have a lens diameter of 240 μm, for example. The number of collimating lenses 156 is equal to the number of reflection lenses 154. The respective collimating lenses 156 are opposed to the respective reflection lenses 154 in the Y direction.

The collimating lens 157 is a spherical lens or a non-spherical lens. The collimating lens 157 can have a lens diameter of 240 μm, for example. The number of collimating lenses 157 is equal to the number of reflection lenses 155. The respective collimating lenses 157 are opposed to the respective reflection lenses 155 in the Y direction.

The second surface 152 in which the collimating lenses 156 and the collimating lenses 157 are provided is parallel to the X-Z plane. Therefore, the center of the collimating lens 156 and the center of the collimating lens 157 are spaced apart from each other in the Z direction.

An arrangement pitch of the collimating lenses 156 and the collimating lenses 157 in the second surface 152 (in the figure, P3, a distance between the centers of the respective lenses) can be 250 μm, for example.

Figure 14:
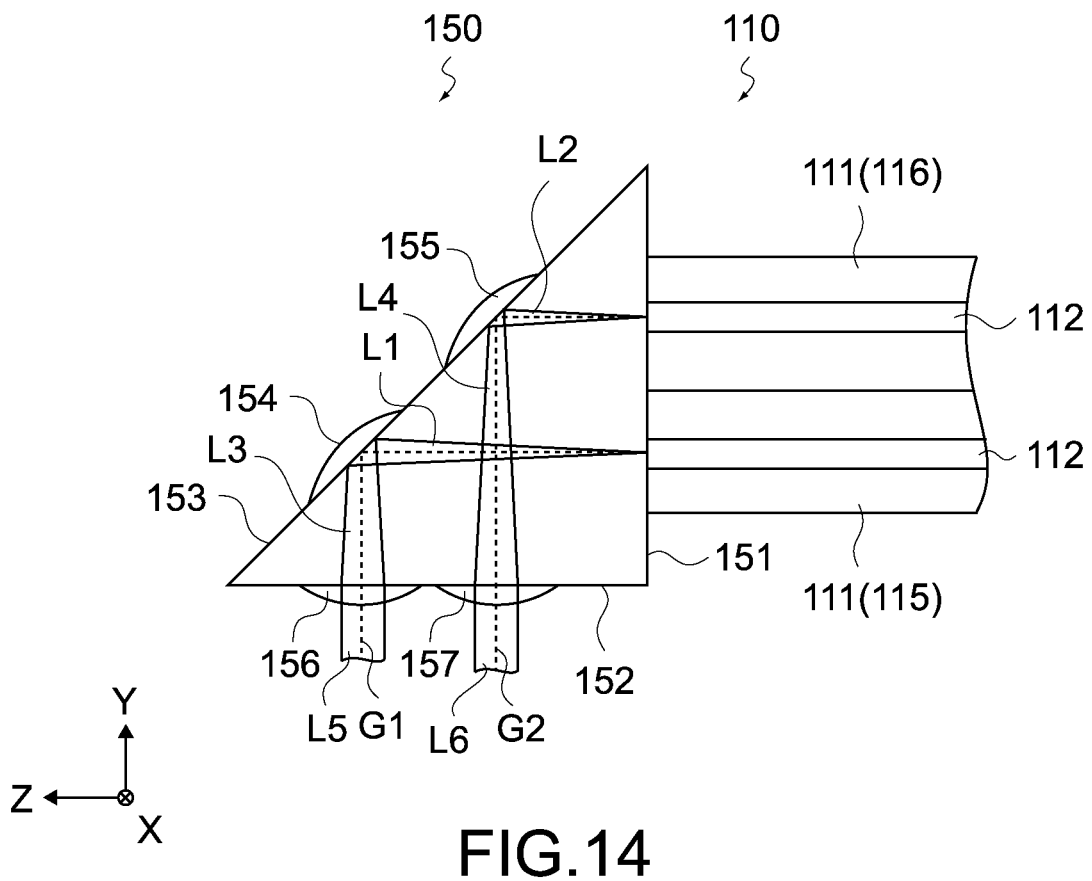
FIG. 14 A schematic view showing routes of light entering the light-guiding portion of the optical connector provided in the optical transmission module.

As described above, light emitted from the optical fibers 115 and light emitted from the optical fibers 116 enter the light-guiding portion 150. FIG. 14 is a schematic view showing routes of light entering the light-guiding portion 150. The optical axis of light entering the light-guiding portion 150 from the optical fiber 115 is shown as an optical axis G1. The optical axis of light entering the light-guiding portion 150 from the optical fiber 116 is shown as an optical axis G2.

As shown in the figure, light L1 emitted from the optical fiber 115 enters the reflection lens 154 in the Z direction. The reflection lens 154 reflects the light L1 in the Y direction. The reflected light of the reflection lens 154 is shown as light L3.

Further, light L2 emitted from the optical fiber 116 enters the reflection lens 155 in the Z direction. The reflection lens 155 reflects the light L2 in the Y direction. The reflected light of the reflection lens 155 is shown as light L4.

The light L3 reflected by the reflection lens 154 enters the collimating lens 156. The collimating lens 156 collimates the light L3 and emits the collimated light L3 in the Y direction. The emitted light of the collimating lens 156 is shown as light L5.

The light L4 reflected by the reflection lens 155 enters the collimating lens 157. The collimating lens 157 collimates the light L4 and emits the collimated light L4 in the Y direction. The emitted light of the collimating lens 157 is shown as light L6.

Although FIG. 14 shows the routes of the emitted light of the one optical fiber 115 and the emitted light of the one optical fiber 116, respective emitted light of the plurality of optical fibers 115 and respective emitted light of the plurality of optical fibers 116 that are arranged in the X direction (see FIG. 3) are also emitted from the collimating lenses 156 and the collimating lenses 157, following the routes as shown in FIG. 14.

The light L5 enters the respective photoelectric conversion elements 135 (see FIG. 5) opposed to the respective collimating lenses 156 and is converted into electrical signals. The light L6 enters the respective photoelectric conversion elements 136 opposed to the collimating lenses 157 and is converted into electrical signals. A pitch of the light L5 and the light L6 (distance between the optical axis G1 and the optical axis G2) can be 250 μm, for example.

Here, the photoelectric conversion elements 133 may be light-emitting elements. In this case, light emitted from the photoelectric conversion elements 133 is transmitted to the optical transmission cable 110 via the light-guiding portion 150. The route of light at this time is an inverse route of that of light entering the light-guiding portion 150 from the optical fibers 115 and the optical fibers 116.

As shown in FIG. 14, the light L5 emitted from the photoelectric conversion element 135 enters the collimating lens 156 opposed thereto. The collimating lens 156 concentrates the light L5 on the optical fiber 115 via the reflection lens 154. The emitted light of the collimating lens 156 is shown as the light L3.

Further, the light L6 emitted from the photoelectric conversion element 136 enters the collimating lens 157 opposed thereto. The collimating lens 157 concentrates the light L6 on the optical fiber 116 via the reflection lens 155. The emitted light of the collimating lens 157 is shown as the light L4.

The reflection lens 154 reflects the incoming light L3 in the Z direction. The light reflected by the reflection lens 154 is shown as the light L1. The reflection lens 155 reflects the incoming light L4 in the Z direction. The light reflected by the reflection lens 155 is shown as the light L2.

The light L1 reflected by the reflection lens 154 enters the optical fiber 115 and the light L2 reflected by the reflection lens 155 enters the optical fiber 116.

[Configurations of Respective Lenses]

As described above, the reflection lens 154 reflects the light L1 to thereby cause the light L3 to arrive at the collimating lens 156. Further, the reflection lens 155 reflects the light L2 to thereby cause the light L4 to arrive at the collimating lens 157.

Figure 15:
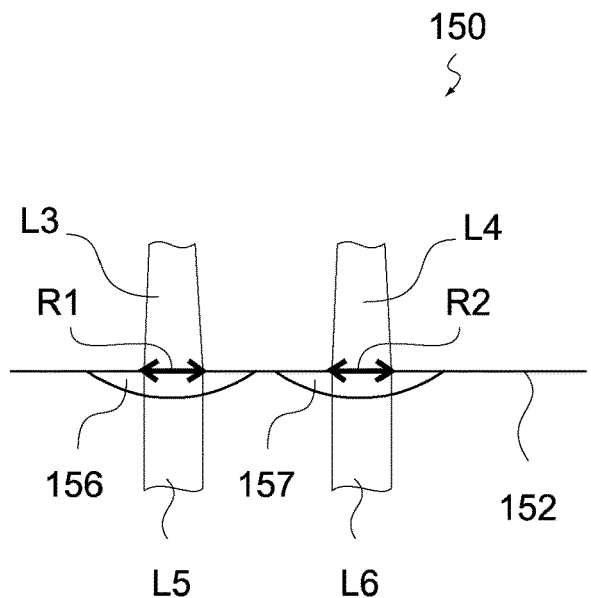
FIG. 15 A schematic view showing routes of light entering the light-guiding portion of the optical connector provided in the optical transmission module.

FIG. 15 is an enlarged view of the collimating lens 156, the collimating lens 157, and the surroundings. As shown in the figure, it is assumed that the light diameter of the light L3 when the light L3 arrives at the collimating lens 156 is a light diameter R1 and the light diameter of the light L4 when the light L4 arrives at the collimating lens 157 is a light diameter R2. Here, the reflection lens 154 and the reflection lens 155 are formed in such a shape that the light diameter R1 and the light diameter R2 are identical.

As shown in FIG. 14, the reflection lens 154 and the reflection lens 155 are formed in the inclined surface 153. Therefore, the distance between the optical fiber 115 and the reflection lens 154 in the Z direction is different from the distance between the optical fiber 116 and the reflection lens 155 in the Z direction. Therefore, the reflection lens 154 and the reflection lens 155 have different shapes and are configured in such a manner that the light diameter R1 and the light diameter R2 are identical.

The collimating lens 156 collimates the light L3 having the light diameter R1 and emits the light L5 having the light diameter R1. The collimating lens 157 collimates the light L4 having the light diameter R2 and emits the light L5 having the light diameter R2. Thus, the collimated light and the collimated light which have an identical light diameter are emitted to the photoelectric conversion element 135 and the photoelectric conversion element 136.

Further, as described above, the collimating lens 156 concentrates the light L5 on the optical fiber 115 via the reflection lens 154. Therefore, the collimating lens 156 has such a shape that the incident light is concentrated on the optical fiber 115.

Also, the collimating lens 157 concentrates the light L6 on the second optical fiber 116 via the reflection lens 155. Therefore, the collimating lens 157 has such a shape that the incident light is concentrated on the optical fiber 116.

[Regarding Effects of Optical Connector]

Effects of the optical connector 120 according to the present technology will be described in comparison with comparative examples.

Figure 16:
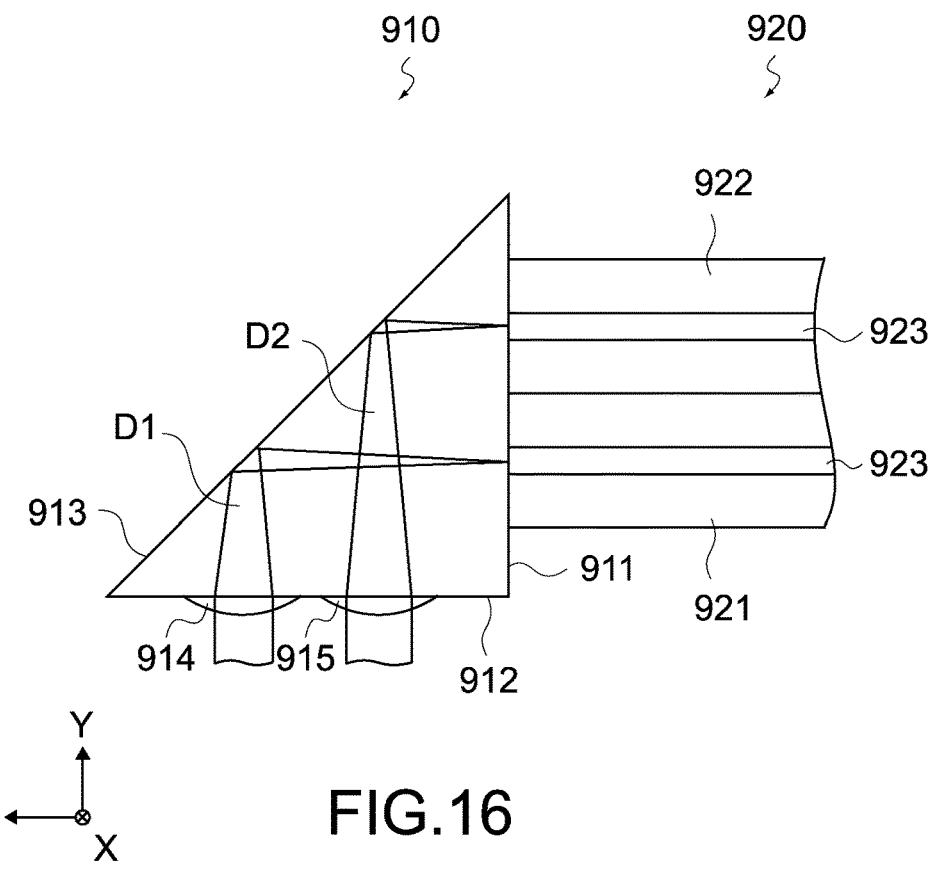
FIG. 16 A schematic view showing routes of light entering a light-guiding portion of an optical connector provided in an optical transmission module according to a first comparative example.

FIG. 16 is a schematic view of a light-guiding portion 910 and an optical transmission cable 920 of an optical connector according to a first comparative example. The optical transmission cable 920 includes an optical fiber 921 and an optical fiber 922.

The optical fiber 921 includes a core 923 and the optical fiber 922 includes a core 923.

As shown in the figure, the light-guiding portion 910 includes a first surface 911, a second surface 912, an inclined surface 913, and a collimating lens 914 and a collimating lens 915 which are formed on the second surface 912. The inclined surface 913 is a light reflection surface.

As shown in the figure, light D1 emitted from the optical fiber 921 is reflected by the inclined surface 913 and enters the collimating lens 914. Further, light D2 emitted from the optical fiber 922 is reflected by the inclined surface 913 and enters the collimating lens 915.

The collimating lens 914 collimates the incoming light D1 and emits the collimated light D1. The collimating lens 915 collimates the incoming light D2 and emits the collimated light D2. Here, in a case where the optical fibers are arranged in the Y direction as shown in the figure, the optical path length from each optical fiber to each collimating lens is longer in comparison with a case where one optical fiber and one collimating lens are provided. Therefore, when the emitted light of the optical fibers arrive at the collimating lenses, the light diameter becomes larger.

When the light diameter of the collimated light becomes larger, vignetting of light occurs at end portions of the collimating lenses and the optical coupling loss increases as will be described later. In contrast, in the optical connector 120 according to the present technology, the incident light is concentrated by the reflection lens 154 and the reflection lens 155 provided in the inclined surface 153 as described above, and thus the light diameter of the light L5 and the light diameter of the light L6 can be made smaller and the optical coupling loss can be reduced.

Figure 17:
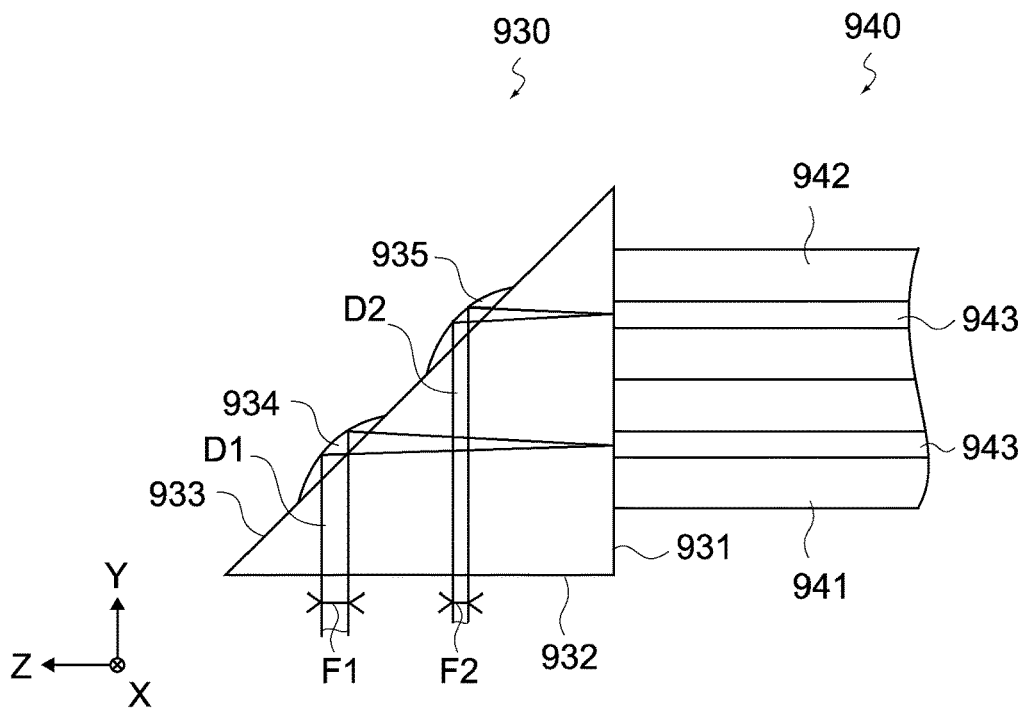
FIG. 17 A schematic view showing routes of light entering a light-guiding portion of an optical connector provided in an optical transmission module according to a second comparative example.

Further, FIG. 17 is a schematic view of a light-guiding portion 930 and an optical transmission cable 940 of an optical connector according to a second comparative example. The optical transmission cable 940 includes an optical fiber 941 and an optical fiber 942. The optical fiber 941 includes a core 943 and the optical fiber 942 includes a core 943.

As shown in the figure, the light-guiding portion 930 includes a first surface 931, a second surface 932, an inclined surface 933, and a first lens 934 and a second lens 935 which are formed on the inclined surface 933. The inclined surface 933 is a light reflection surface.

The first lens 934Y is a reflection lens that reflects incident light and is a collimating lens that collimates the incident light. The second lens 935 is a reflection lens that reflects incident light and is a collimating lens that collimates the incident light.

As shown in the figure, the light D1 emitted from the optical fiber 941 is reflected and collimated by the first lens 934. Further, the light D2 emitted from the optical fiber 942 is reflected and collimated by the second lens 935.

In this case, the distance between the optical fiber 941 and the first lens 934 in the Z direction is different from a distance between the optical fiber 942 and the second lens 935 in the Z direction. Therefore, the light D1 that arrives at the first lens 934 and the light D2 that arrives at the second lens 935 have different light diameters. The first lens 934 and the second lens 935 collimate the incident light in such a state. Therefore, the light diameter (in the figure, F1) of the light D1 and the light diameter (in the figure, F2) of the light D2, which are emitted from the light-guiding portion 930, are different from each other.

Thus, if this optical connector is laterally deviated or inclined, for example, the optical coupling loss between the light D1 and the photoelectric conversion element becomes different from the optical coupling loss between the light D2 and the photoelectric conversion element, and the optical signal integrity differs between the optical fiber 941 and the second optical fiber 942. Therefore, in such a structure, it is necessary to perform positioning between the optical connector and the photoelectric conversion element with a high precision. Thus an inexpensive organic substrate or the like cannot be used.

In contrast, in the optical connector 120 according to the present technology, the light L5 and the light L6 emitted from the light-guiding portion 150 are configured to have an identical light diameter as described above. Therefore, even if the optical connector is laterally deviated or inclined, for example, a difference in optical coupling loss as in the second comparative example is not caused.

As described above, in the optical connector 120 according to the present technology, the light L5 and the light L6 having a relatively small, identical light diameter are emitted from the light-guiding portion 150. Thus, the optical coupling loss between the collimated light and the photoelectric conversion element is reduced, and position deviation between the optical connector and the photoelectric conversion element is allowed in some degree. Therefore, even if an inexpensive organic substrate or the like is used, it is possible to transmit high-integrity optical signals.

[Regarding Light Diameter]

It is favorable that the light diameter R1 (see FIG. 15) of the light L5 emitted by the collimating lens 156 and the light diameter R2 of the light L6 emitted by the collimating lens 157 are both 160 μm or more and 200 μm or less. Hereinafter, the reason will be described.

A diameter T of the optical fiber 111 shown in FIG. 4 can be 250 μm. Most of optical fibers are defined to have a diameter of 250 μm in accordance with standards. In this case, as shown in FIG. 3, the arrangement pitch P1 of the optical fibers 111 in the optical transmission cable 110 is also 250 µm. Most of multi-mode optical fibers are also defined to have a numerical aperture (NA) of 0.2.

Here, with the structure of the first comparative example (see FIG. 16), it is difficult to set the diameter of each of the optical fiber 921 and the optical fiber 922 to 250 µm and the arrangement pitch to 250 µm due to the principles of optics.

Specifically, in order to ensure a margin against axis deviation between the collimating lenses, the diameter of each of the collimating lens 914 and the collimating lens 915 is set to 240 µm and the light diameter of emitted light from each collimating lens is set to 180 µm. Assuming that the lens pitch is set to 250 µm from the above-mentioned reason, the diameter of the collimating lens is set to 240 µm which is a substantially maximum diameter within that range. Further, regarding the light diameter of 180 µm, 180 µm is considered as an optimal diameter from various analyses for taking a deviation allowance as large as possible and making it strong against disturbance.

Figure 18:
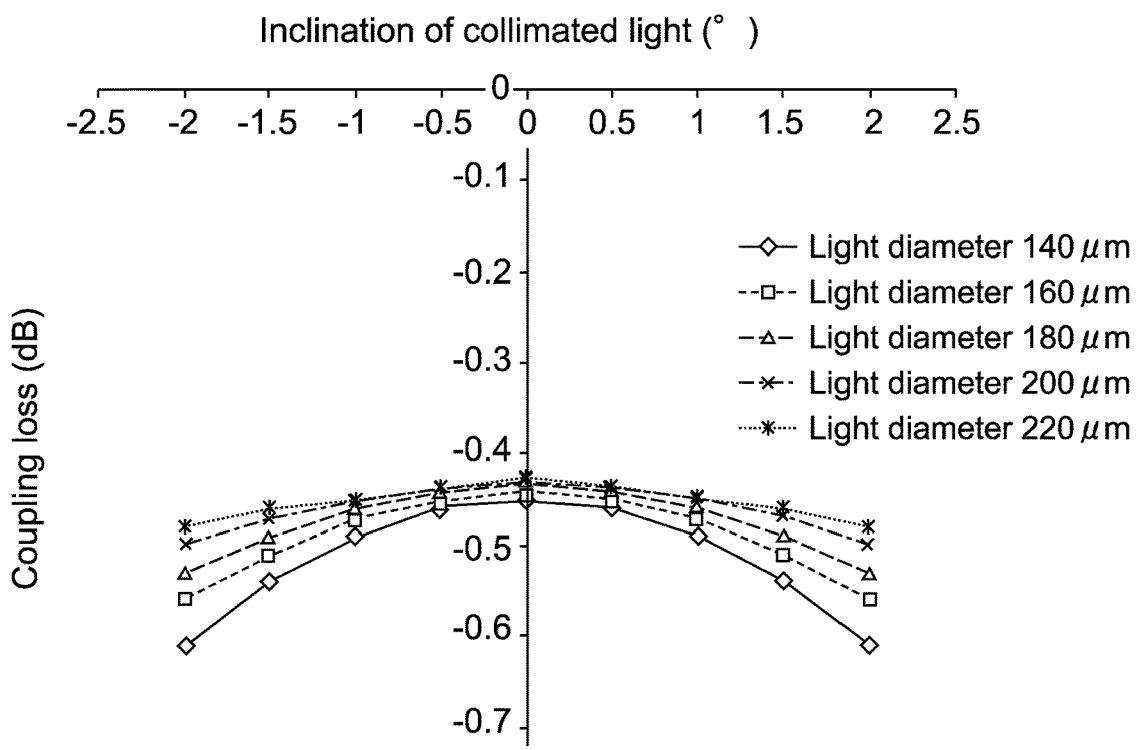
FIG. 18 A graph showing a relationship between inclination and coupling loss with light diameters of collimated light.

That is, if the light diameter of the collimated light is too small, the numerical aperture of a condensing lens system becomes smaller, and thus an irradiation spot is greatly blurred. Therefore, it becomes an optical system weak against the inclination of the collimated light, i.e., inclination of the optical connector. FIG. 18 shows results of simulating influences of the inclination. As shown in the figure, as the light diameter of the collimated light becomes smaller, the coupling loss due to the inclination becomes larger. Further, as the light diameter of the collimated light becomes smaller, light-blocking resistance against foreign matters in the optical paths becomes lower. Therefore, the light diameter R1 and the light diameter R2 are favorably both 160 µm or more.

Figure 19:
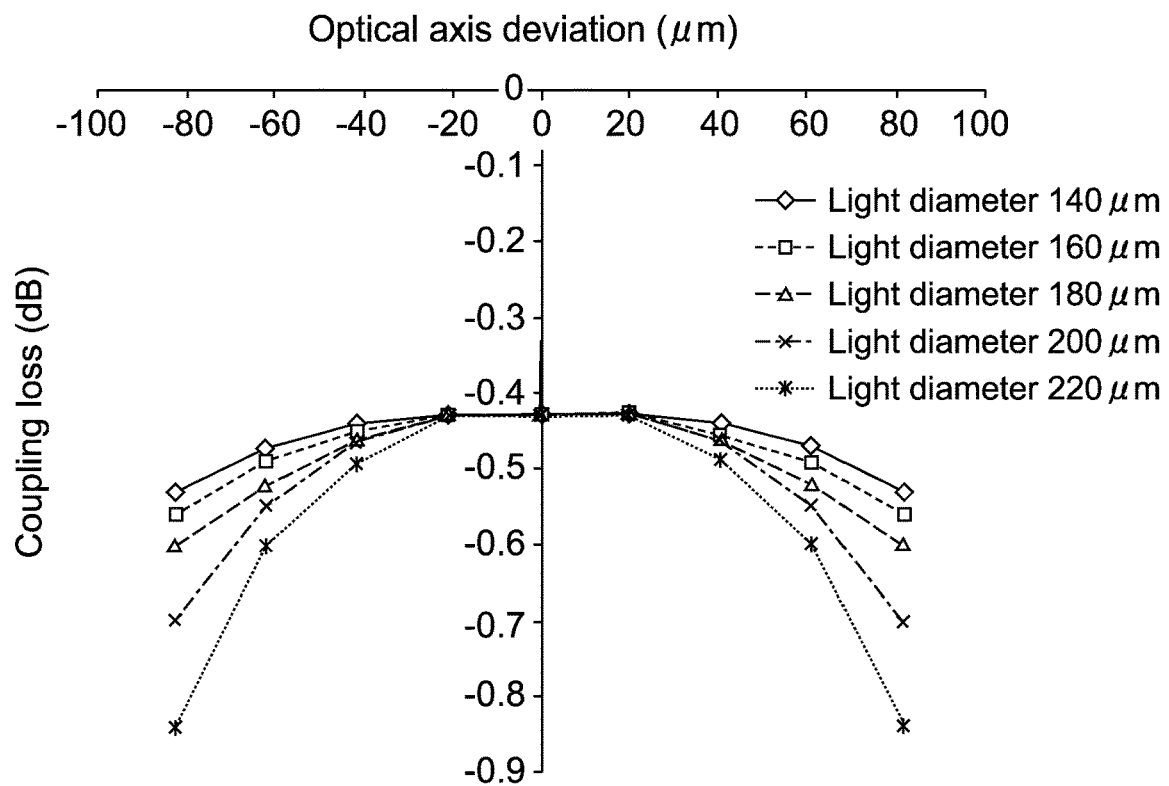
FIG. 19 A graph showing a relationship between optical axis deviation and coupling loss with light diameters of collimated light.

On the other hand, if the light diameter of the collimated light is too large, the resistance to the lateral deviation of the collimated light becomes smaller. That is, if the collimated light is deviated by ±30 µm in the relationship of a diameter of 240 µm to a diameter of 180 µm, vignetting of light occurs at the lens end portion and the loss increases. FIG. 19 results of simulating influences of the lateral deviation. As shown in the figure, as the light diameter of the collimated light becomes larger, the coupling loss due to the lateral deviation becomes larger. Therefore, the light diameter R1 and the light diameter R2 are favorably both 200 µm or less.

Figure 20:
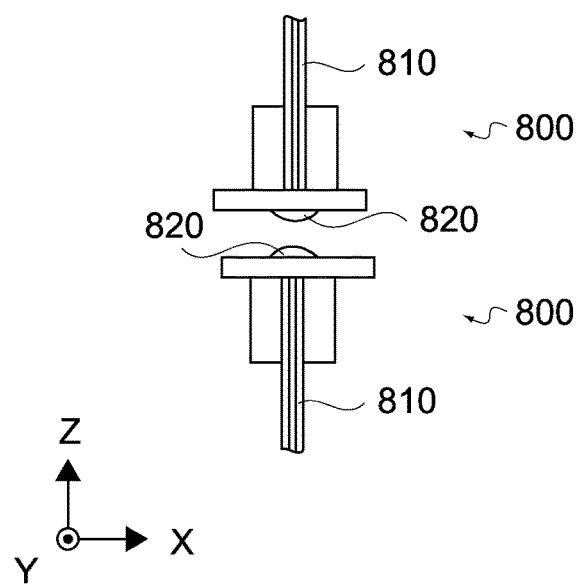
FIG. 20 A schematic view of samples to be measured for measuring coupling loss with respect to optical axis deviation of collimated light.

The light diameter of the collimated light is favorably 160 µm or more and 200 µm or less, and more favorably 180 µm, which is a diameter keeping the above-mentioned two trade-off relationships well-balanced. Samples were actually made and the optical coupling loss thereof was measured. FIG. 20 is a schematic view of samples to be measured 800. As shown in the figure, each of the samples to be measured 800 includes an optical fiber 810 and a collimating lens 820.

Figure 21:
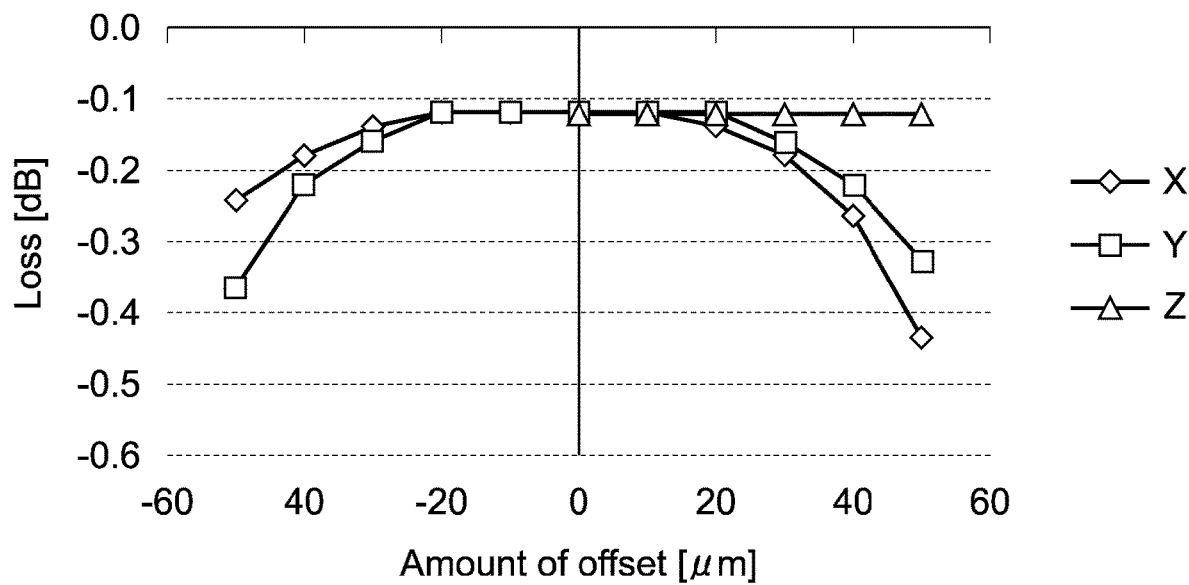
FIG. 21 A graph showing a relationship between optical axis deviation and coupling loss with collimated light having a light diameter of 180 μm.

The optical fiber 810 has a fiber diameter of 250 µm. The collimating lens 820 is a lens that emits light entering from the optical fiber 810 as collimated light having a light diameter of 180 µm. The two samples to be measured 800 were spaced apart from each other while the collimating lenses 820 are opposed to each other. Then, the lateral deviation and the optical coupling loss between the collimating lenses 820 were measured. FIG. 21 shows measurement results thereof. As shown in the figure, it has been confirmed that, when the light diameter of the collimated light is set to 180 µm, the increase in optical coupling loss is kept below 1 dB even if the optical axis of the collimated light is deviated by ±50 µm.

The multi-mode optical fibers are defined to have a numerical aperture of 0.2 in accordance with multi-mode optical fiber (MMF) standards. A typical refractive index of resin that is the material of the light-guiding portion 150 is normally about 1.5. Thus, light emitted from the multi-mode optical fibers according to the standards has a diameter of 180 µm at a distance of 600 µm.

Here, in a case where the optical fibers are arranged in the Y direction as shown in the first comparative example (see FIG. 16), the optical path length from each optical fiber to each collimating lens is longer in comparison with a case where one optical fiber and one collimating lens are provided. Therefore, when the emitted light of the optical fibers arrive at the collimating lenses, the light diameter becomes larger than 180 µm. Thus, collimated light having a light diameter of 180 µm cannot be emitted.

Note that, by reducing the size of the light-guiding portion 910 as much as possible, there is a possibility that it can be realized. However, the light-guiding portion 910 is a molded resin, and thus it is difficult to maintain a necessary strength.

Therefore, with the structure according to the first comparative example, it is difficult to set the light diameter of the collimated light to 180 µm suitable for transmission. In the above-mentioned second comparative example (see FIG. 17), it is also possible to set the light diameter of the collimated light from either one of the two collimating lenses to 180 µm. However, a difference is caused in the light diameter of the collimated light as described above, and thus the light diameter of the collimated light and the light diameter of the collimated light emitted from the two collimating lenses cannot be both set to 180 µm.

In contrast, in the optical connector 120 according to this embodiment, the light diameter R1 of the light L5 emitted from the collimating lens 156 and the light diameter R2 of the light L6 emitted from the collimating lens 157 can be both set to 180 µm.

Consequently, the optical connector 120 according to this embodiment is favorable particularly in a case of using two-dimensionally arranged optical fibers each having a diameter of 250 µm according to the standards.

Second Embodiment

An optical transmission module according to a second embodiment of the present technology will be described. In the optical transmission module according to the second embodiment, configurations other than the light-guiding portion are similar to those of the first embodiment, and thus descriptions thereof will be omitted.

[Configuration of Light-Guiding Portion]

Figure 22:
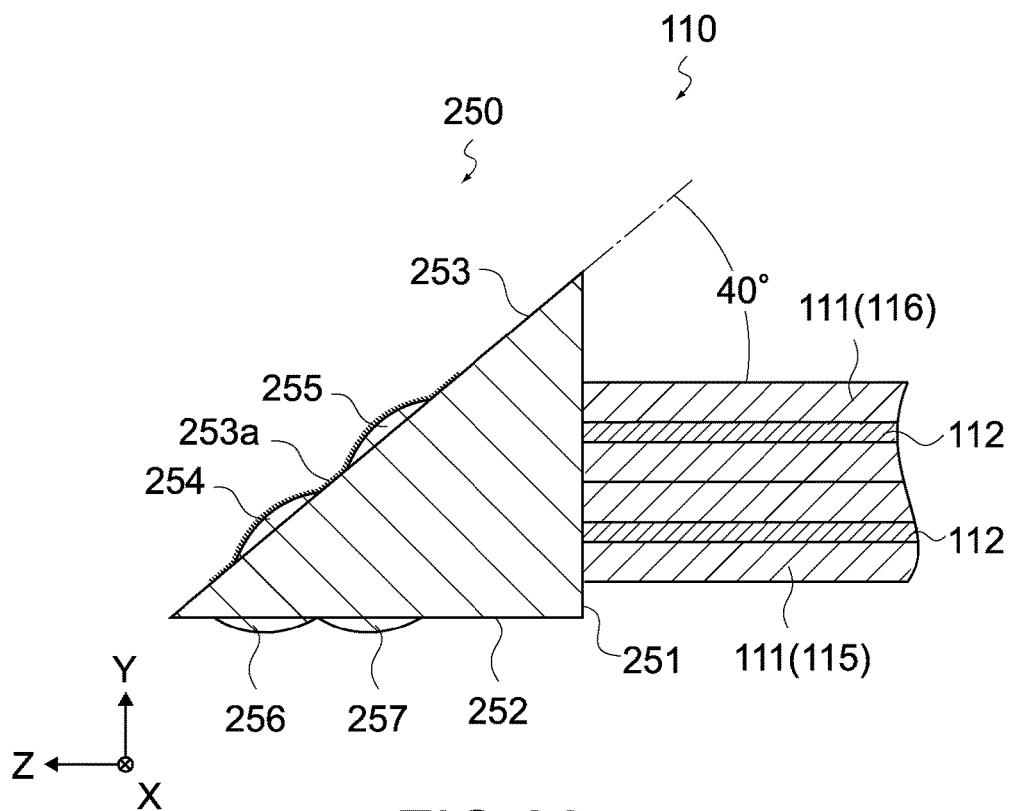
FIG. 22 A cross-sectional view of a light-guiding portion of an optical connector and an optical transmission cable which are provided in an optical transmission module according to a second embodiment of the present technology.

The optical transmission module according to this embodiment includes a light-guiding portion 250. FIG. 22 is a cross-sectional view of the light-guiding portion 250 and an optical transmission cable 110. As shown in the figure, the light-guiding portion 250 is a triangular prism-shape portion including a first surface 251, a second surface 252, and an inclined surface 253.

As described in the first embodiment, the optical transmission cable 110 includes a plurality of optical fibers 111 two-dimensionally arranged. As shown in FIG. 3, it is assumed that the arrangement direction of the optical fibers 111 in the optical fiber row 111a and the optical fiber row 111b is the X direction, the arrangement direction of the optical fiber row 111a and the optical fiber row 111b is the Y direction, and the optical axis direction of emitted light from the optical fibers 111 is the Z direction.

The first surface 251 is a surface extending along the X-Y plane and the second surface 252 is a surface extending along the X-Z plane. The inclined surface 253 is a surface inclined with respect to the X-Z plane. Although not particularly limited, the angle of inclination of the inclined surface 253 with respect to the X-Z plane is smaller than 45° in this embodiment. For example, as shown in the figure, the angle of inclination of the inclined surface 253 with respect to the X-Z plane can be 40°.

Although not particularly limited, the material of the light-guiding portion 250 is favorably a material having a high light permeability. For example, polyphenylenesulfide (PPS) can be used therefor.

As shown in FIG. 22, the end portions of the optical fibers 111 are opposed to the first surface 251. These end portions may be held in contact with the first surface 251 or may be spaced apart from the first surface 251. It should be noted that, in a case where the end portions of the optical fibers 111 are spaced apart from the first surface 251, distances between the respective end portions of the optical fibers 111 and the first surface 251 need to be identical.

Reflection lenses 254 and reflection lenses 255 are provided in the inclined surface 253. As in the first embodiment, the plurality of reflection lenses 254 are arranged in the X direction and form a reflection lens row. Further, the reflection lenses 255 are also arranged in the X direction and form a reflection lens row. An arrangement pitch of the reflection lenses 254 and the reflection lenses 255 in the inclined surface 253 can be 250 µm, for example.

The reflection lens 254 can have an elliptical shape having a major-axis direction in the Y direction. Alternatively, the reflection lens 254 may have an elliptical shape having a minor-axis direction in the Y direction. The number of reflection lenses 254 is equal to the number of optical fibers 115. The respective reflection lenses 254 are opposed to the respective optical fibers 115 in the Z direction.

The reflection lens 255 can have an elliptical shape having a major-axis direction in the Y direction. Alternatively, the reflection lens 255 may have an elliptical shape having a minor-axis direction in the Y direction. The number of reflection lenses 255 is equal to the number of optical fibers 116. The respective reflection lenses 255 are opposed to the respective optical fibers 116 in the Z direction.

The inclined surface 253 in which the reflection lenses 254 and the reflection lenses 255 are provided is inclined with respect to the X-Z plane. Therefore, the center of the reflection lens 254 and the center of the reflection lens 255 are spaced apart from each other in the Z direction and the Y direction.

Further, as shown in FIG. 22, a light reflection region 253a is provided in the inclined surface 253. The light reflection region 253a is a total reflection mirror or a metal mirror, and can be obtained by forming a thin film made of a material having a high light reflectance, such as aluminum or stainless steel, on the inclined surface 253. The light reflection region 253a may be provided in the entire inclined surface 253 or may be provided only inside the reflection lenses 254 and the reflection lenses 255.

Collimating lenses 256 and collimating lenses 257 are provided in the second surface 252. As in the first embodiment, the plurality of collimating lenses 256 are arranged in the X direction and form a collimating lens row. Further, the collimating lenses 257 are also arranged in the X direction and form a collimating lens row. An arrangement pitch of the collimating lenses 256 and the collimating lenses 257 in the second surface 252 can be 250 µm, for example.

The collimating lens 256 is a spherical lens or a non-spherical lens. The number of collimating lenses 256 is equal to the number of reflection lenses 254. The respective collimating lenses 256 are provided at positions further spaced apart from the first surface 251 in comparison with the collimating lenses 156 according to the first embodiment.

The collimating lens 257 is a spherical lens or a non-spherical lens. The number of collimating lenses 257 is equal to the number of reflection lenses 255. The respective collimating lenses 257 are provided at positions further spaced apart from the first surface 251 in comparison with the collimating lenses 157 according to the first embodiment.

The second surface 252 in which the collimating lenses 256 and the collimating lenses 257 are provided is parallel to the X-Z plane. Therefore, the center of the collimating lens 256 and the center of the collimating lens 257 are spaced apart from each other in the Z direction.

Figure 23:
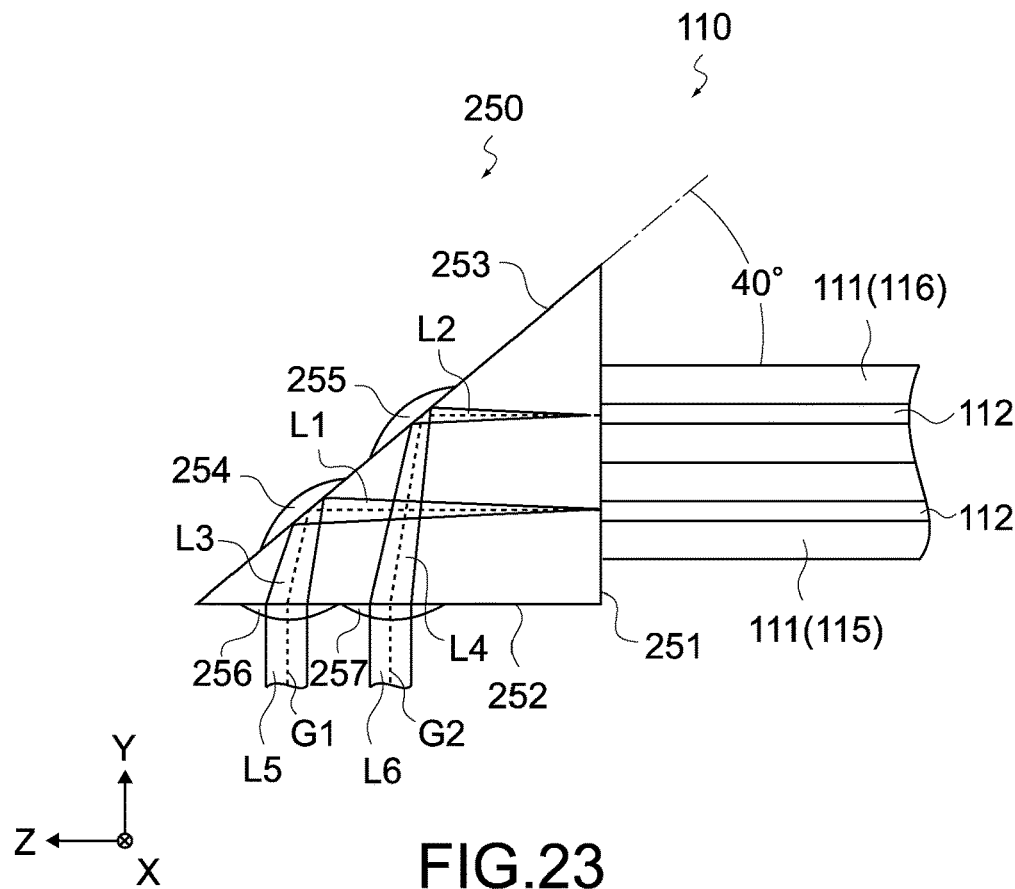
FIG. 23 A schematic view showing routes of light entering the light-guiding portion of the optical connector provided in the optical transmission module.

Light emitted from the optical fibers 115 and light emitted from the optical fibers 116 enter the light-guiding portion 250. FIG. 23 is a schematic view showing routes of light entering the light-guiding portion 250. The optical axis of light entering the light-guiding portion 250 from the optical fiber 115 is shown as an optical axis G1. The optical axis of light entering the light-guiding portion 250 from the optical fiber 116 is shown as an optical axis G2.

As shown in the figure, light L1 emitted from the optical fiber 115 enters the reflection lens 254 in the Z direction. The reflection lens 254 reflects the light L1 toward the collimating lens 256. The reflected light of the reflection lens 254 is shown as light L3.

Further, light L2 emitted from the optical fiber 116 enters the reflection lens 255 in the Z direction. The reflection lens 255 reflects the light L2 toward the collimating lens 257. The reflected light of the reflection lens 255 is shown as light L4.

The light L3 reflected by the reflection lens 254 enters the collimating lens 256. The collimating lens 256 collimates the light L3 and emits the collimated light in the Y direction. The emitted light of the collimating lens 256 is shown as light L5.

The light L4 reflected by the reflection lens 255 enters the collimating lens 257. The collimating lens 257 collimates the light L4 and emits the collimated light L4 in the Y direction. The emitted light of the collimating lens 257 is shown as light L6.

Although FIG. 23 shows the optical paths of the emitted light of the one optical fiber 115 and the one optical fiber 116, respective emitted light of the plurality of optical fibers 115 and respective emitted light of the plurality of optical fibers 116 that are arranged in the X direction (see FIG. 3) are also emitted from the collimating lenses 256 and the collimating lenses 257, following the optical paths as shown in FIG. 23.

The light L5 enters the respective photoelectric conversion elements 135 (see FIG. 5) opposed to the respective collimating lenses 256 and is converted into electrical signals. The light L6 enters the respective photoelectric conversion elements 136 opposed to the collimating lenses 257 is converted into electrical signals.

As in the first embodiment, the photoelectric conversion elements 133 may be light-emitting elements. In this case, light emitted from the photoelectric conversion elements 133 passes through the light-guiding portion 250 in an inverse route of that of the light L1 to the light L6 and is transmitted to the optical transmission cable 110.

At this time, the angle of inclination of the inclined surface 253 with respect to the X-Z plane is smaller than 45°, and thus an angle formed by the optical axis G1 of the light L3 entering the inclined surface 253 from the collimating lens 256 and the inclined surface 253 is smaller than 45°.

Further, an angle formed by the optical axis G2 of the light L4 entering the inclined surface 253 from the collimating lens 257 and the inclined surface 253 is smaller than 45°.

[Configurations of Respective Lenses]

As in the first embodiment, the reflection lens 254 and the reflection lens 255 are formed in such a shape that the light diameter of the light L3 when the light L3 arrives at the collimating lens 256 and the light diameter of the light L4 when the light L4 arrives at the collimating lens 257 are identical.

Further, the collimating lens 256 has such a shape that it can concentrate incident light on the optical fiber 115 via the reflection lens 254 and the collimating lens 257 has such a shape that it can concentrate incident light on the optical fiber 116 via the reflection lens 255.

[Regarding Effects of Optical Connector]

Effects of the optical connector according to the present technology will be described in comparison with comparative examples.

Figure 24:
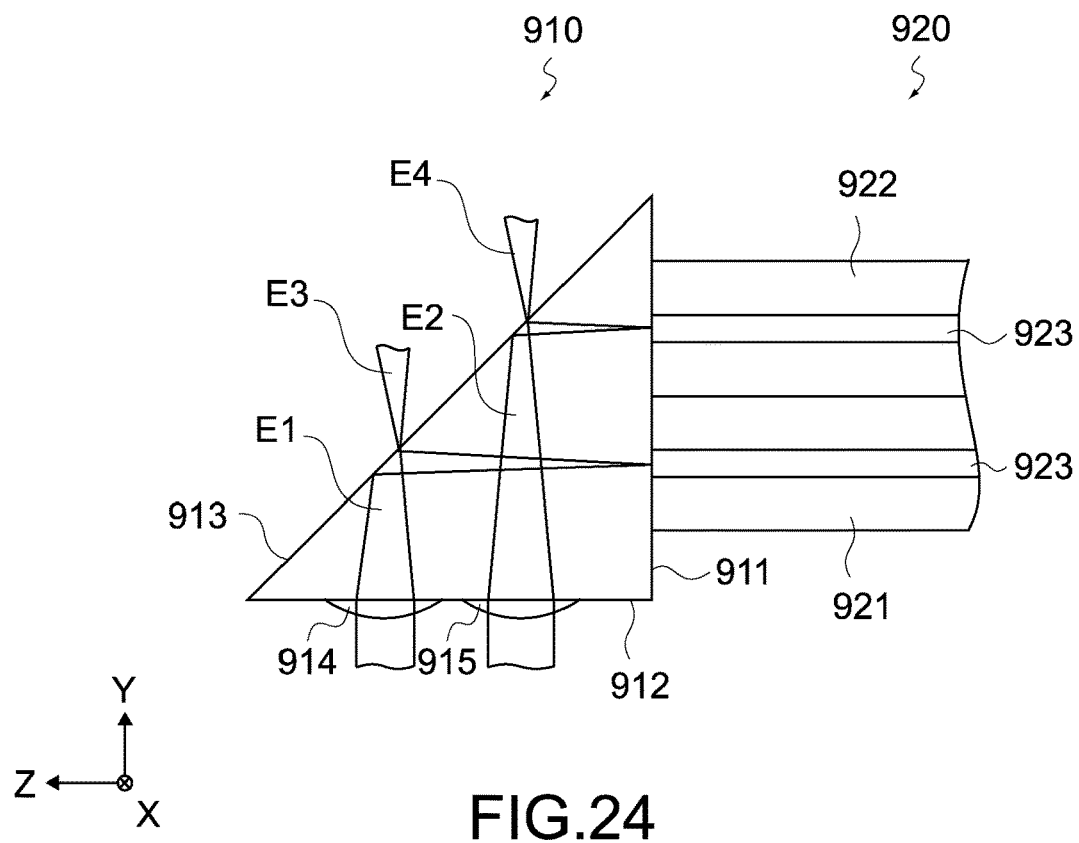
FIG. 24 A schematic view showing routes of light entering the light-guiding portion of the optical connector provided in the optical transmission module according to the first comparative example.

FIG. 24 is a schematic view showing routes of light in the optical connector according to the above-mentioned comparative example 1. As shown in the figure, light E1 entering the collimating lens 914 from the photoelectric conversion element is reflected on the inclined surface 913 that is a light reflection surface and enters the optical fiber 921. Here, when it is reflected on the inclined surface 913, components of the light E1, which correspond to about 3°, are not reflected and are transmitted through the inclined surface 913. In the figure, the light transmitted through the inclined surface 913 is shown as light E3.

Also, components of light E2 entering the collimating lens 915 from the photoelectric conversion element, which correspond to about 3°, are not reflected and are transmitted through the inclined surface 913. In the figure, the light transmitted through the inclined surface 913 is shown as light E4. Here, if reflection lenses are provided in the inclined surface 913, the loss components further increase.

In contrast, in the light-guiding portion 250 according to the present technology, by setting the angle of inclination of the inclined surface 253 with respect to the X-Z plane to be smaller than 45°, the angle of inclination of the inclined surface 253 with respect to the optical axis of light entering the inclined surface 253 from each of the collimating lens 256 and the collimating lens 257 is set to be smaller than 45°.

Thus, the angles of incidence of the light entering the reflection lens 254 from the collimating lens 256 and the light entering the reflection lens 255 from the collimating lens 257 become smaller, and it becomes possible to reduce the loss components of the light transmitted through the reflection lens 254 and the reflection lens 255.

Third Embodiment

An optical transmission module according to a third embodiment of the present technology will be described. In the optical transmission module according to the third embodiment, configurations other than the light-guiding portion are similar to those of the first embodiment, and thus descriptions thereof will be omitted.

[Configuration of Light-Guiding Portion]

Figure 25:
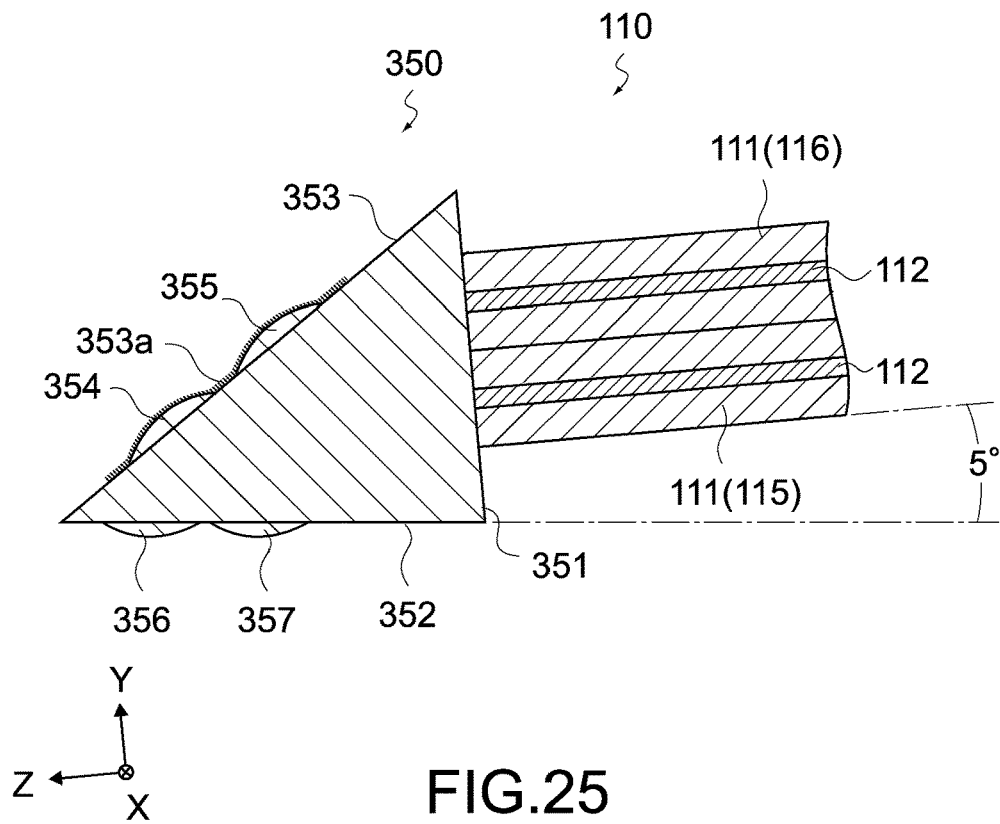
FIG. 25 A cross-sectional view of a light-guiding portion of an optical connector and an optical transmission cable which are provided in an optical transmission module according to a third embodiment of the present technology.

The optical transmission module according to this embodiment includes a light-guiding portion 350. FIG. 25 is a cross-sectional view of the light-guiding portion 350 and an optical transmission cable 110. As shown in the figure, the light-guiding portion 350 is a triangular prism-shape portion including a first surface 351, a second surface 352, and an inclined surface 353.

As described in the first embodiment, the optical transmission cable 110 includes a plurality of optical fibers 111 two-dimensionally arranged. As shown in FIG. 3, it is assumed that the arrangement direction of the optical fibers 111 in the optical fiber row 111a and the optical fiber row 111b is the X direction, the arrangement direction of the optical fiber row 111a and the optical fiber row 111b is the Y direction, and the optical axis direction of emitted light from the optical fibers 111 is the Z direction.

The first surface 351 is a surface extending along the X-Y plane. In this embodiment, optical fibers 115 and optical fibers 116 are inclined with respect to the second surface 352, i.e., the second surface 352 is inclined with respect to the X-Z plane. As shown in the figure, the angle of inclination of the second surface 352 with respect to the X-Z plane can be 5°, for example.

The inclined surface 353 is a surface inclined with respect to the X-Z plane. For example, the angle of inclination of the inclined surface 353 with respect to the X-Z plane can be 40° and the angle of inclination of the inclined surface 353 with respect to the second surface 352 can be 45°. By inclining the optical fiber 115 and the optical fiber 116 with respect to the second surface 352, an angle formed by the X-Z plane and the inclined surface 353 becomes smaller.

Although not particularly limited, the material of the light-guiding portion 350 is favorably a material having a high light permeability. For example, polyphenylenesulfide (PPS) can be used therefor.

As shown in FIG. 25, the end portions of the optical fibers 111 opposed to the first surface 351. These end portions may be held in contact with the first surface 351 or may be spaced apart from the first surface 351. It should be noted that, in a case where the end portions of the optical fibers 111 are spaced apart from the first surface 351, distances between the respective end portions of the optical fibers 111 and the first surface 351 need to be identical.

Reflection lenses 354 and reflection lenses 355 are provided in the inclined surface 353. As in the first embodiment, the plurality of reflection lenses 354 are arranged in the X direction and form a reflection lens row. Further, the reflection lenses 355 are also arranged in the X direction and form a reflection lens row. An arrangement pitch of the reflection lenses 354 and the reflection lenses 355 in the inclined surface 353 can be 250 μm, for example.

The reflection lens 354 can have an elliptical shape having a major-axis direction in the Y direction. Alternatively, the reflection lens 354 may have an elliptical shape having a minor-axis direction in the Y direction. The number of reflection lenses 354 is equal to the number of optical fibers 115 and the respective reflection lenses 354 are opposed to the respective optical fibers 115 in the Z direction.

The reflection lens 355 can have an elliptical shape having a major-axis direction in the Y direction. Further, the reflection lens 355 may have an elliptical shape having a minor-axis direction in the Y direction. The number of reflection lenses 355 is equal to the number of optical fibers 116 and the respective reflection lenses 355 are opposed to the respective optical fibers 115 in the Z direction.

The inclined surface 353 in which the reflection lenses 354 and the reflection lenses 355 are provided is inclined with respect to the X-Z plane. Therefore, the center of the reflection lens 354 and the center of the reflection lens 355 are spaced apart from each other in the Z direction and the Y direction.

Further, as shown in FIG. 25, a light reflection region 353a is provided in the inclined surface 353. The light reflection region 353a is a total reflection mirror or a metal mirror, and can be obtained by forming a thin film made of a material having a high light reflectance, such as aluminum or stainless steel, on the inclined surface 353. The light reflection region 353a may be provided in the entire inclined surface 353 or may be provided only inside the reflection lenses 354 and the reflection lenses 355.

Collimating lenses 356 and collimating lenses 357 are provided in the second surface 352. As in the first embodiment, the plurality of collimating lenses 356 are arranged in the X direction and form a collimating lens row. Further, the collimating lenses 357 are also arranged in the X direction and form a collimating lens row. An arrangement pitch of the collimating lenses 356 and the collimating lenses 357 in the second surface 352 can be 250 µm, for example.

The collimating lens 356 is a spherical lens or a non-spherical lens. The number of collimating lenses 356 is equal to the number of reflection lenses 354. The respective collimating lenses 356 are provided at positions further spaced apart from the first surface 351 in comparison with the collimating lenses 156 according to the first embodiment.

The collimating lens 357 is a spherical lens or a non-spherical lens. The number of collimating lenses 357 is equal to the number of reflection lenses 355. The respective collimating lenses 357 are provided at positions further spaced apart from the first surface 351 in comparison with the collimating lenses 157 according to the first embodiment.

The second surface 352 in which the collimating lenses 356 and the collimating lenses 357 are provided is inclined with respect to the X-Z plane. Therefore, the center of the collimating lens 356 and the center of the collimating lens 357 are spaced apart from each other in the Z direction and the Y direction.

Figure 26:
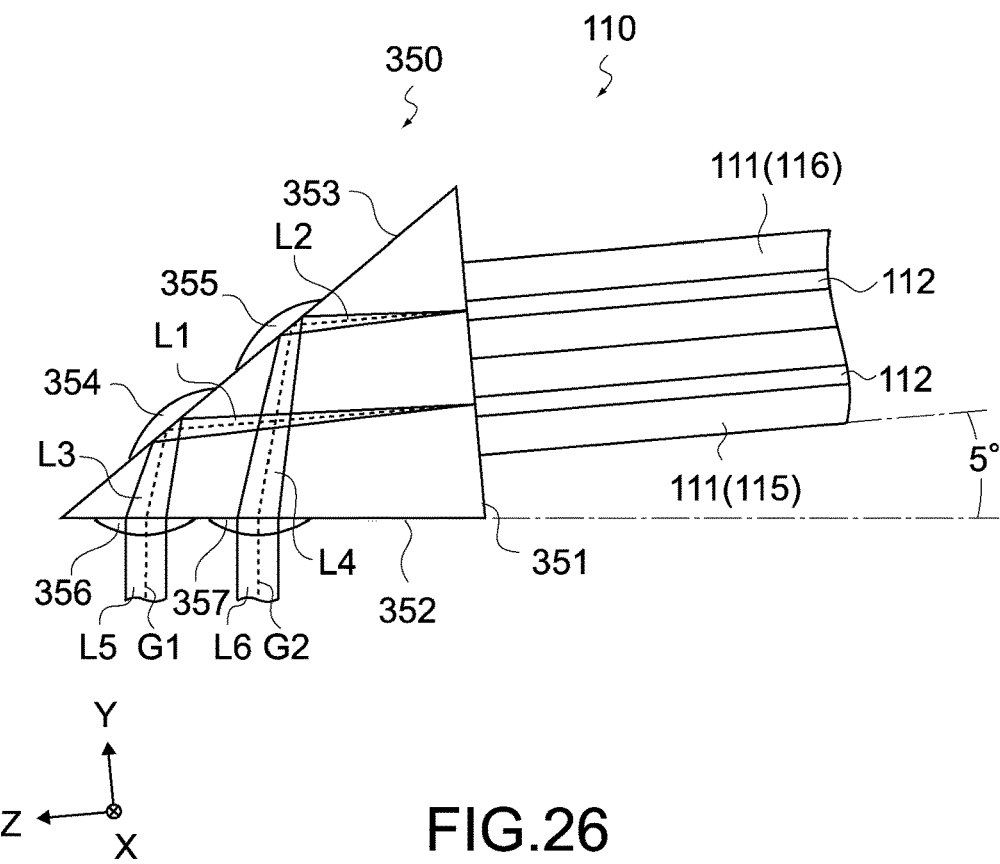
FIG. 26 A schematic view showing routes of light entering the light-guiding portion of the optical connector provided in the optical transmission module.

Light emitted from the optical fibers 115 and light emitted from the optical fibers 116 enter the light-guiding portion 350. FIG. 26 is a schematic view showing routes of light entering the light-guiding portion 350. The optical axis of light entering the light-guiding portion 350 from the optical fiber 115 is shown as an optical axis G1. The optical axis of light entering the light-guiding portion 350 from the optical fiber 116 is shown as an optical axis G2.

As shown in the figure, light L1 emitted from the optical fiber 115 enters the reflection lens 354 in the Z direction. The reflection lens 354 reflects the light L1 toward the collimating lens 356. The reflected light of the reflection lens 354 is shown as the light L3.

Further, light L2 emitted from the optical fiber 116 enters the reflection lens 355 in the Z direction. The reflection lens 355 reflects the light L2 toward the collimating lens 357. The reflected light of the reflection lens 355 is shown as light L4.

The light L3 reflected by the reflection lens 354 enters the collimating lens 356. The collimating lens 356 collimates the light L3 and the collimated light L3 in a direction inclined with respect to the Y direction. The emitted light of the collimating lens 356 is shown as light L5.

The light L4 reflected by the reflection lens 355 enters the collimating lens 357. The collimating lens 357 collimates the light L4 and emits the collimated light L4 in a direction inclined with respect to the Y direction. The emitted light of the collimating lens 357 is shown as light L6.

Although FIG. 26 shows the optical paths of the emitted light of the one optical fiber 115 and the one optical fiber 116, respective emitted light of the plurality of optical fibers 115 and respective emitted light of the plurality of optical fibers 116 that are arranged in the X direction (see FIG. 3) are also emitted from the collimating lenses 356 and the collimating lenses 357, following the routes as shown in FIG. 26.

The light L5 enters the respective photoelectric conversion elements 135 (see FIG. 5) opposed to the respective collimating lenses 356 and is converted into electrical signals. The light L6 enters the respective photoelectric conversion elements 136 opposed to the collimating lenses 357 and is converted into electrical signals.

As in the first embodiment, the photoelectric conversion elements 133 may be light-emitting elements. In this case, light emitted from the photoelectric conversion elements 133 passes through the light-guiding portion 350 in an inverse route of that of the light L1 to the light L6 and is transmitted to the optical transmission cable 110.

At this time, the angle of inclination of the second surface 352 with respect to the X-Z plane is equal to or larger than 5°, and thus an angle formed by the optical axis G1 of the light L3 entering the inclined surface 353 from the collimating lens 356 and the inclined surface 353 is smaller than 45°. Further, an angle formed by the optical axis G2 of the light L4 entering the inclined surface 353 from the collimating lens 357 and the inclined surface 353 is smaller than 45°.

[Configurations of Respective Lenses]

As in the first embodiment, the reflection lens 354 and the reflection lens 355 are formed in such a shape that the light diameter of the light L3 when the light L3 arrives at the collimating lens 356 and the light diameter of the light L4 when the light L4 arrives at the collimating lens 357 are identical.

Further, the collimating lens 356 has such a shape that it can concentrate incident light on the optical fiber 115 via the reflection lens 354 and the collimating lens 357 has such a shape that it can concentrate incident light on the optical fiber 116 via the reflection lens 355.

[Regarding Effects of Optical Connector]

In the light-guiding portion 350 according to this embodiment, as described above, the optical fibers 115 and the optical fibers 116 are inclined with respect to the second surface 352 by 5° or more. Thus, the angle of inclination of the inclined surface 353 with respect to the optical axis of the light emitted from each of the optical fiber 115 and the optical fiber 116 becomes smaller, and the angle of inclination of the light, which enters the light-guiding portion 350 in the inverse route of that of this light, with respect to the inclined surface 353 also becomes smaller.

Specifically, the angle of inclination of the inclined surface 353 with respect to the optical axis of light entering the inclined surface 353 from each of the collimating lens 356 and the collimating lens 357 is smaller than 45°. Thus, as in the second embodiment, it becomes possible to reduce the loss components of the light transmitted through the reflection lens 354 and the reflection lens 355.

Modified Example 1

Figure 27:
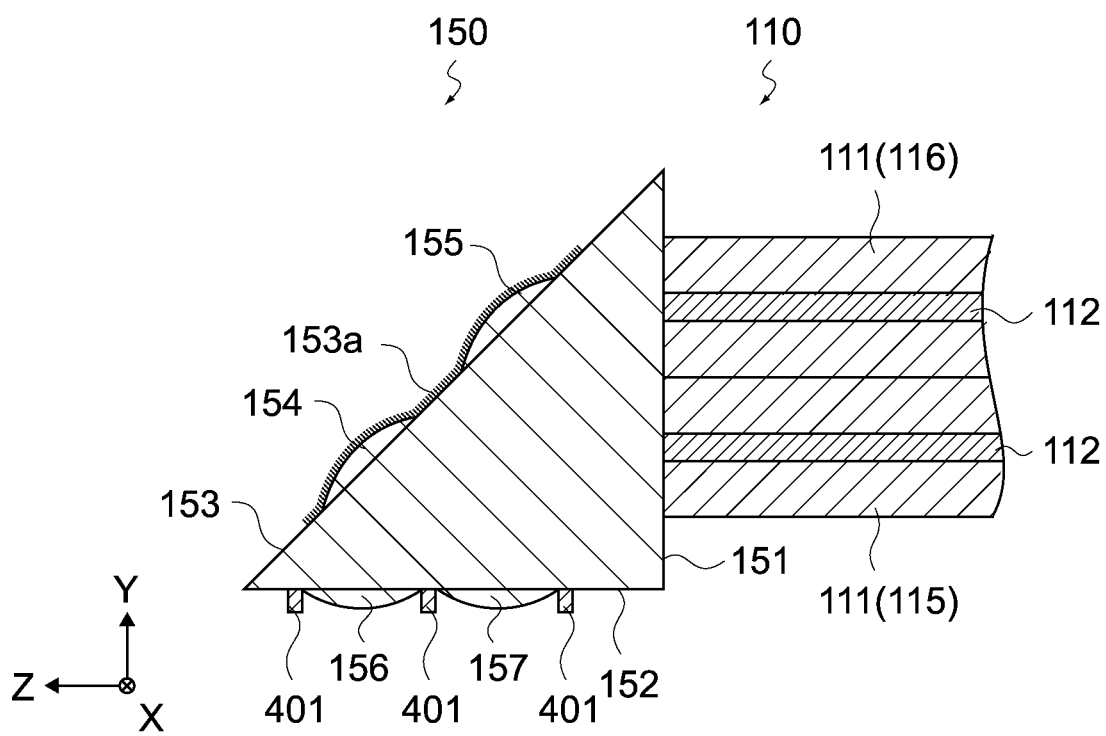
FIG. 27 A cross-sectional view of an optical connector and an optical transmission cable which are provided in an optical transmission module according to a modified example of the present technology.
Figure 28:
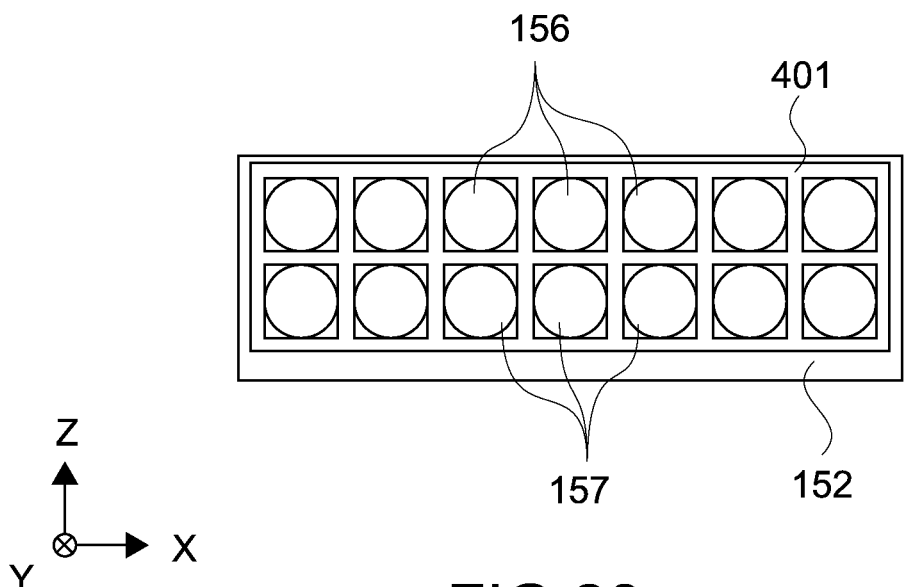
FIG. 28 A plan view of a second surface of the light-guiding portion of the optical connector provided in the optical transmission module.

An optical transmission module according to a modified example of the present technology will be described. FIG. 27 is a cross-sectional view showing an light-guiding portion 150 provided in an optical transmission module according to a modified example of the first embodiment. FIG. 28 is a plan view of a second surface 152 of the light-guiding portion 150 provided in the optical transmission module.

As shown in these figures, an aperture 401 may be provided in the second surface 152. The aperture 401 is a grid-like member that is provided between the respective collimating lenses of the collimating lenses 156 and the collimating lenses 157 and blocks light between the adjacent collimating lenses.

The aperture 401 can have a bank-shape protruding from the second surface 152 and can have a width of 10 μm and a height of 10 μm. Alternatively, the aperture 401 may have a planar structure not protruding from the second surface 152. In order to prevent light from scattering, the color of the aperture 400 is favorably black-based color that is absorption color.

The aperture 401 blocks light between the respective collimating lenses, which makes it possible to further prevent leakage of light (stray light) between the collimating lenses.

Also in the second embodiment and the third embodiment of the present technology, the aperture may be provided around the collimating lenses.

Modified Example 2

Although the optical transmission cable 110 has the configuration in which the plurality of optical fibers 111 are two-dimensionally arranged in the above-mentioned respective embodiments, the present technology is also applicable to an optical transmission cable having another configuration.

Figure 29:
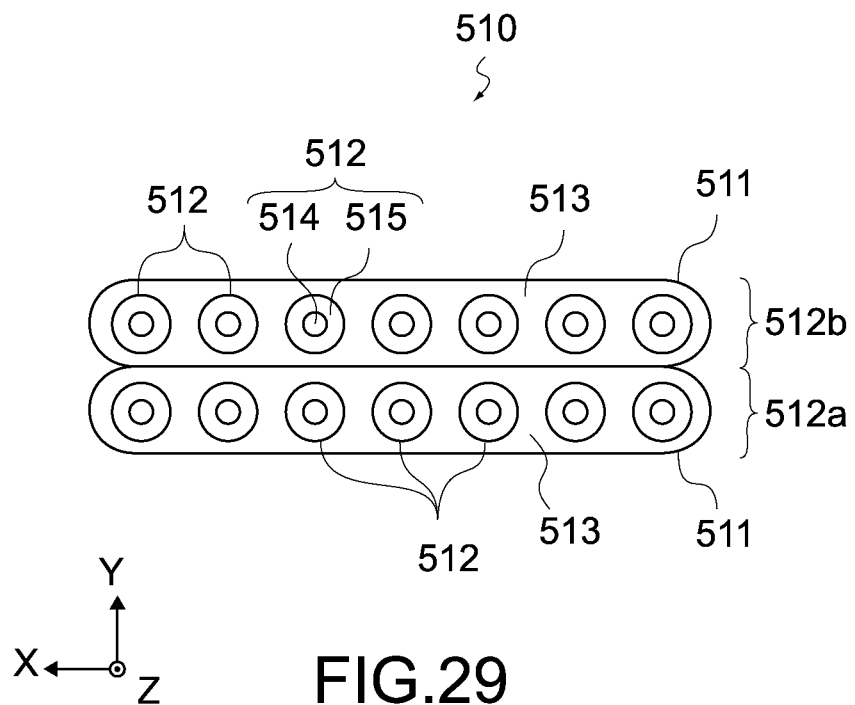
FIG. 29 A cross-sectional view of an optical transmission cable according to a modified example of the present technology.

FIG. 29 is a cross-sectional view of an optical transmission cable 510 according to a first modified example. As shown in the figure, the optical transmission cable 510 includes two fiber ribbons 511.

Each of the fiber ribbons 511 includes a plurality of optical fibers 512 and a second coating layer 513.

Each of the optical fibers 512 includes an optical fiber core 514 formed of a core and a cladding and a first coating layer 515 that coats the optical fiber core 514. The first coating layer 515 is made of ultraviolet curable resin and the like. The plurality of optical fibers 512 form an optical fiber row 512*a* in which the optical fibers 512 are arranged in the X direction and an optical fiber row 512*b* in which the optical fibers 512 are also arranged in the X direction. The optical fiber row 512*a* and the optical fiber row 512*b* are each coated with the second coating layer 513 made of ultraviolet curable resin and the like.

The two fiber ribbons 511 are stacked in the Y direction. Also with configuration, the cores that are optical transmission paths are arranged in two directions of the X direction and the Y direction, i.e., are two-dimensionally arranged.

Figure 30:
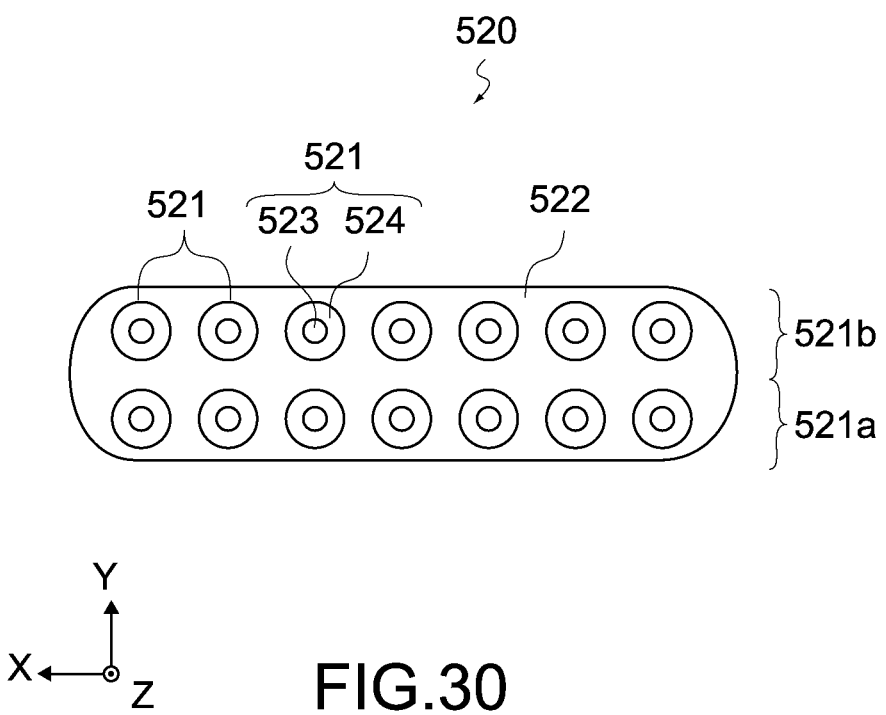
FIG. 30 A cross-sectional view of an optical transmission cable according to a modified example of the present technology.

FIG. 30 is a cross-sectional view of an optical transmission cable 520 according to a second modified example. As shown in the figure, the optical transmission cable 520 includes a plurality of optical fibers 521 and a second coating layer 522.

Each of the optical fibers 521 includes an optical fiber core 523 formed of a core and a cladding and a first coating layer 524 that coats the optical fiber core 523. The first coating layer 524 is made of ultraviolet curable resin and the like.

The plurality of optical fibers 521 form an optical fiber row 521*a* in which the optical fibers 521 are arranged in the X direction and an optical fiber row 521*b* in which the optical fibers 521 are also arranged in the X direction. The optical fiber row 521*a* and the optical fiber row 521*b* are arranged in the Y direction. The plurality of optical fibers 521 are coated with the second coating layer 522. Also with this configuration, the cores that are optical transmission paths are arranged in two directions of the X direction and the Y direction, i.e., are two-dimensionally arranged.

Figure 31:
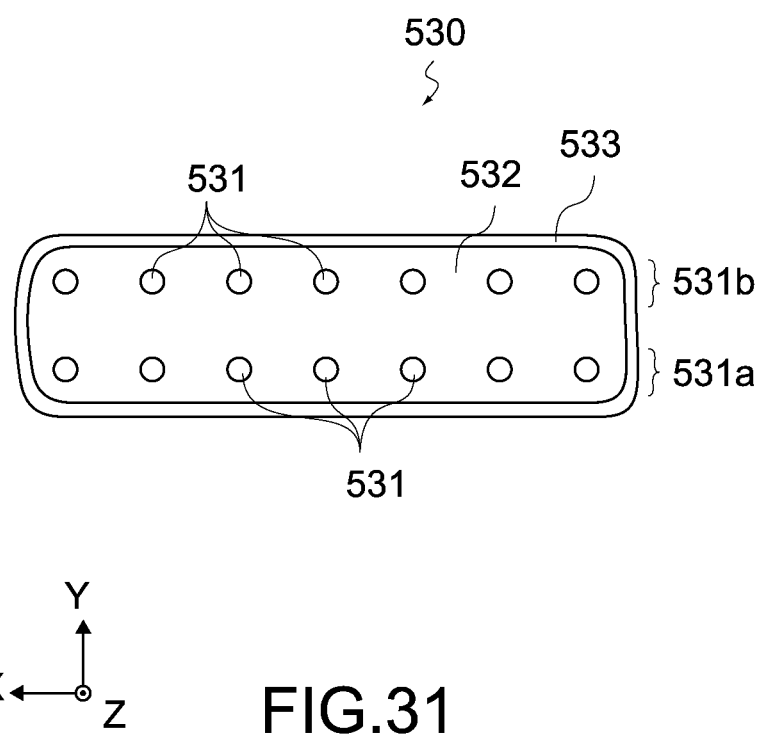
FIG. 31 A cross-sectional view of an optical transmission cable according to a modified example of the present technology.

FIG. 31 is a cross-sectional view of an optical transmission cable 530 according to a third modified example. As shown in the figure, the optical transmission cable 520 includes a plurality of cores 531, a cladding 532, and a coating layer 533.

The plurality of cores 531 form a core row 531*a* in which the cores 531 are arranged in the X direction and a core row 531*b* in which the cores 531 are also arranged in the X direction. The core row 531*a* and the core row 531*b* are arranged in the Y direction. The plurality of cores 531 are coated with the cladding 532 and the cladding 532 is coated with the coating layer 533 made of ultraviolet curable resin and the like. Also with this configuration, the cores 531 that are optical transmission paths are arranged in two directions of the X direction and the Y direction, i.e., are two-dimensionally arranged.

Otherwise, the optical connector according to the present technology can be used for connecting an optical transmission cable including two-dimensionally arranged optical transmission paths. The optical transmission cable is not limited to the single optical transmission cable, and may be a bundle of optical transmission cables.

It should be noted that the present technology may also take the following configurations.

(1)

An optical connector for a plurality of optical transmission paths arranged in a two-dimensional array, including:
a first lens that reflects emitted light from a first optical transmission path of the plurality of optical transmission paths;
a second lens that reflects emitted light from a second optical transmission path of the plurality of optical transmission paths;
a third lens that collimates light reflected by the first lens; and
a fourth lens that collimates light reflected by the second lens.

(2)

The optical connector according to (1), in which
the third lens concentrates collimated light incoming in a direction opposite to that of the emitted light from the first optical transmission path, on the first optical transmission path via the first lens, and
the fourth lens concentrates collimated light incoming in a direction opposite to that of the emitted light from the second optical transmission path, on the second optical transmission path via the second lens.

(3)

The optical connector according to (1) or (2), in which
the first optical transmission path and the second optical transmission path have an identical numerical aperture,
the first lens causes the emitted light from the first optical transmission path to enter the third lens such that the emitted light from the first optical transmission path has a first light diameter at the third lens, and
the second lens causes the emitted light from the second optical transmission path to enter the fourth lens such that the emitted light from the second optical transmission path has the first light diameter at the fourth lens.

(4)

The optical connector according to any one of (1) to (3), in which
the first light diameter is 160 μm or more and 200 μm or less.

(5)
The optical connector according to any one of (1) to (4), in which
the plurality of optical transmission paths include a first optical transmission path row in which the first optical transmission paths are arranged in a first direction and a second optical transmission path row in which the second optical transmission paths are arranged in the first direction, the first optical transmission path row and the second optical transmission path row being arranged in a second direction orthogonal to the first direction.

(6)
The optical connector according to (5), in which
an arrangement pitch of the optical transmission paths in the first direction and the second direction is 250 µm.

(7)
The optical connector according to (5) or (6), in which
the first optical transmission paths and the second optical transmission paths are opposed to a first surface,
the third lens and the fourth lens are provided in a second surface, and
the first lens and the second lens are provided in an inclined surface inclined with respect to a third direction orthogonal to the first direction and the second direction.

(8)
The optical connector according to (7), in which an arrangement pitch of the third lens and the fourth lens in the second surface is 250 µm.

(9)
The optical connector according to (7) or (8), in which
an angle formed by an optical axis of light entering the inclined surface from each of the third lens and the fourth lens and the inclined surface is smaller than 45°.

(10)
The optical connector according to any one of (7) to (9), further including
an aperture that is provided between lenses of the plurality of third lenses and the plurality of fourth lenses and blocks light between adjacent lenses in the second surface.

(11)
An optical transmission module, including:
a plurality of optical transmission paths arranged in a two-dimensional array; and
an optical connector including a first lens that reflects emitted light from a first optical transmission path of the plurality of optical transmission paths, a second lens that reflects emitted light from a second optical transmission path of the plurality of optical transmission paths, a third lens that collimates light reflected by the first lens, and a fourth lens that collimates light reflected by the second lens.

REFERENCE SIGNS LIST 100 optical transmission module
110 optical transmission cable
111, 115, 116 optical fiber
120 optical connector
130 connector connection portion
133, 135, 136 photoelectric conversion element
150, 250, 350 light-guiding portion
151, 251, 351 first surface
152, 252, 352 second surface
153, 253, 353 inclined surface
154, 254, 354 reflection lens
155, 255, 355 reflection lens
156, 256, 356 collimating lens
157, 257, 357 collimating lens

What is claimed is:

1. An optical connector for a plurality of optical transmission paths arranged in a two-dimensional array, comprising:
a first lens that reflects emitted light from a first optical transmission path of the plurality of optical transmission paths;
a second lens that reflects emitted light from a second optical transmission path of the plurality of optical transmission paths;
a third lens that collimates light reflected by the first lens; and
a fourth lens that collimates light reflected by the second lens, wherein the first and the second lens are reflection lenses and have an elliptical shape, and wherein the third and the fourth lens have a spherical shape.

2. The optical connector according to claim 1, wherein
the third lens concentrates collimated light incoming in a direction opposite to that of the emitted light from the first optical transmission path, on the first optical transmission path via the first lens, and
the fourth lens concentrates collimated light incoming in a direction opposite to that of the emitted light from the second optical transmission path, on the second optical transmission path via the second lens.

3. The optical connector according to claim 1, wherein
the first optical transmission path and the second optical transmission path have an identical numerical aperture,
the first lens causes the emitted light from the first optical transmission path to enter the third lens such that the emitted light from the first optical transmission path has a first light diameter at the third lens, and
the second lens causes the emitted light from the second optical transmission path to enter the fourth lens such that the emitted light from the second optical transmission path has the first light diameter at the fourth lens.

4. The optical connector according to claim 3, wherein the first light diameter is 160 µm or more and 200 µm or less.

5. The optical connector according to claim 1, wherein
the plurality of optical transmission paths include a first optical transmission path row in which a plurality of the first optical transmission paths are arranged in a first direction and a second optical transmission path row in which a plurality of the second optical transmission paths are arranged in the first direction, the first optical transmission path row and the second optical transmission path row being arranged in a second direction orthogonal to the first direction.

6. The optical connector according to claim 5, wherein
an arrangement pitch of the plurality of optical transmission paths in the first direction and the second direction is 250 µm.

7. The optical connector according to claim 5, wherein
the plurality of first optical transmission paths and the plurality of second optical transmission paths are opposed to a first surface,
the third lens and the fourth lens are provided in a second surface, and
the first lens and the second lens are provided in an inclined surface inclined with respect to a third direction orthogonal to the first direction and the second direction.

8. The optical connector according to claim 7, wherein an arrangement pitch of the third lens and the fourth lens in the second surface is 250 μm.

9. The optical connector according to claim 7, wherein an angle formed by an optical axis of light entering the inclined surface from each of the third lens and the fourth lens and the inclined surface is smaller than 45°.

10. The optical connector according to claim 7, further comprising
an aperture that is provided between lenses of the third lens and the fourth lens and blocks light between adjacent lenses in the second surface.

11. An optical transmission module, comprising:
a plurality of optical transmission paths arranged in a two-dimensional array; and
an optical connector including a first lens that reflects emitted light from a first optical transmission path of the plurality of optical transmission paths, a second lens that reflects emitted light from a second optical transmission path of the plurality of optical transmission paths, a third lens that collimates light reflected by the first lens, and a fourth lens that collimates light reflected by the second lens, wherein the first and the second lens are reflection lenses and have an elliptical shape, and wherein the third and the fourth lens have a spherical shape.

* * * * *